US012713010B2

(12) United States Patent
Park et al.

(10) Patent No.: US 12,713,010 B2
(45) Date of Patent: Aug. 18, 2026

(54) VIDEO ENCODING/DECODING METHOD AND DEVICE FOR DERIVING WEIGHT INDEX FOR BIDIRECTIONAL PREDICTION OF MERGE CANDIDATE, AND METHOD FOR TRANSMITTING BITSTREAM

(71) Applicant: Nokia Technologies Oy, Espoo (FI)

(72) Inventors: Nae Ri Park, Seoul (KR); Jung Hak Nam, Seoul (KR); Hyeong Moon Jang, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/962,637

(22) Filed: Nov. 27, 2024

(65) Prior Publication Data

US 2025/0175590 A1 May 29, 2025

Related U.S. Application Data

(63) Continuation of application No. 17/564,640, filed on Dec. 29, 2021, now Pat. No. 12,184,835, which is a (Continued)

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC ...................................................... H04N 19/00
See application file for complete search history.

(56) References Cited

U.S. PATENT DOCUMENTS

2018/0098063 A1 4/2018 Chen et al.
2018/0131943 A1 5/2018 Park et al.
(Continued)

FOREIGN PATENT DOCUMENTS

CN 108605137 A 9/2018
GB 2578150 A 4/2020
(Continued)

OTHER PUBLICATIONS

A. Robert et al., "Non-CE4: BCW inheritance for pairwise", Joint Video Experts Team (JVET) of ITU-T SG 16 WP 3 and ISO/IEC JTC 1/SC 29/WG 11, Jul. 3-12, 2019, JVET-O0516.
(Continued)

*Primary Examiner* — Maryam A Nasri
(74) *Attorney, Agent, or Firm* — ALSTON & BIRD LLP

(57) ABSTRACT

An image encoding/decoding method and apparatus are provided. An image decoding method according to the present disclosure may comprise constructing an affine merge candidate list for a current block, based on an inter prediction mode of the current block being an affine merge mode, selecting one affine merge candidate from the affine merge candidate list, deriving motion information of the current block based on motion information of the selected affine merge candidate, generating a prediction block of the current block based on the motion information of the current block, and reconstructing the current block based on the prediction block of the current block. The constructing the affine merge candidate list may comprise deriving a constructed affine merge candidate, and the deriving the constructed affine merge candidate may comprise deriving a weight index for bi-prediction of the constructed affine merge candidate.

20 Claims, 18 Drawing Sheets

Related U.S. Application Data continuation of application No. PCT/KR2020/008798, filed on Jul. 6, 2020.

(60) Provisional application No. 62/884,658, filed on Aug. 8, 2019, provisional application No. 62/871,067, filed on Jul. 5, 2019.

(51) Int. Cl.

| | |
|---|---|
| ***H04N 19/137*** | (2014.01) |
| ***H04N 19/159*** | (2014.01) |
| ***H04N 19/176*** | (2014.01) |

(56) References Cited

U.S. PATENT DOCUMENTS

| | | | | |
|---|---|---|---|---|
| 2019/0058896 | A1 | 2/2019 | Huang et al. | |
| 2019/0158870 | A1 | 5/2019 | Xu et al. | |
| 2019/0230350 | A1 | 7/2019 | Chen et al. | |
| 2021/0337196 | A1* | 10/2021 | Lee | H04N 19/54 |
| 2022/0060718 | A1* | 2/2022 | Zhang | H04N 19/70 |

FOREIGN PATENT DOCUMENTS

| | | | |
|---|---|---|---|
| KR | 10-2009-0012926 | A | 2/2009 |
| KR | 10-2017-0124080 | A | 11/2017 |
| KR | 10-2019-0018624 | A | 2/2019 |
| WO | 2016/175549 | A1 | 11/2016 |
| WO | 2017/148345 | A1 | 9/2017 |
| WO | 2018/226066 | A1 | 12/2018 |

OTHER PUBLICATIONS

Advisory Action (PTOL-303) Mailed on Feb. 24, 2023 for U.S. Appl. No. 17/564,640, 3 page(s).
Advisory Action (PTOL-303) Mailed on Jul. 5, 2023 for U.S. Appl. No. 17/564,640, 3 page(s).
Advisory Action (PTOL-303) Mailed on Nov. 2, 2022 for U.S. Appl. No. 17/564,640, 3 page(s).
Bross et al., "Versatile Video Coding (Draft 5)", Joint Video Experts Team (JVET) of ITU-T SG 16 WP 3 and ISO/IEC JTC 1/SC 29/WG 11, 14th Meeting, Document JVET-N1001-v8, (Mar. 19-27, 2019), 400 pages.
Bross et al., "Versatile Video Coding (Draft 5)", Joint Video Experts Team (JVET) of ITU-T SG 16 WP 3 and ISO/IEC JTC 1/SC 29/WG 11, 14th Meeting, Document: JVET-N1001-v10, (Mar. 19-27, 2019), 406 pages.
Chen et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11, 14th Meeting, Document: JVET-N1002-v2, (Mar. 19-27, 2019), 80 pages.
Chen, Jie et al. Non-CE2: Gbi inheritance for constructed affine merge candidate. JVET-N481. Joint Video Experts Team (JVET) of ITU-T SG 16 WP 3 and ISO/IEC JTC 1/SC 29/WG 11. 14th Meeting: Geneva, CH. Mar. 22, 2019. See pp. 1-2.
Decision to Grant for Chinese Application No. 202080062596.1 dated Jul. 19, 2024, 6 pages.
Decision to Grant for Japanese Application No. 2022-500060 dated May 9, 2023, 6 pages.
Decision to Grant for Japanese Application No. 2023-099756 dated Jul. 2, 2024, 6 pages.
Decision to Grant for Japanese Application No. 2024-122996 dated Apr. 30, 2025, 6 pages.
Decision to Grant for Japanese Application No. 2025-090698 dated Jan. 20, 2026, 6 pages.
Extended European Search Report for European Application No. 20836552.8 dated May 31, 2023, 10 pages.
Final Rejection Mailed on Apr. 13, 2023 for U.S. Appl. No. 17/564,640, 23 page(s).
Final Rejection Mailed on Dec. 8, 2022 for U.S. Appl. No. 17/564,640, 20 page(s).
Final Rejection Mailed on Sep. 1, 2022 for U.S. Appl. No. 17/564,640, 18 page(s).
First Examination Report for Indian Application No. 202217005686 dated Apr. 28, 2022, 6 pages.
Hearing Notice for Indian Application No. 202217005686 dated Apr. 23, 2024, 2 pages.
N. Park et al., "Non-CE4: Simplifications on BCW index derivation process", Joint Video Experts Team (JVET) of ITU-T SG 16 WP 3 and ISO/IEC JTC 1/SC 29/WG 11, Jul. 3-12, 2019, JVET-O0366.
N. Park et al., "Non-CE4: The proposed BCW index derivation for pairwise candidate", Joint Video Experts Team (JVET) of ITU-T SG 16 WP 3 and ISO/IEC JTC 1/SC 29/WG 11, Jul. 3-12, 2019, JVET-O0367.
Non-Final Rejection Mailed on May 26, 2022 for U.S. Appl. No. 17/564,640, 13 page(s).
Notice of Allowance and Fees Due (PTOL-85) Mailed on Aug. 21, 2024 for U.S. Appl. No. 17/564,640, 8 page (s).
Notice of Reasons for Refusal for Japanese Application No. 2022-500060 dated Jan. 17, 2023, 11 pages.
Notice of Reasons for Refusal for Japanese Application No. 2023-099756 dated Mar. 26, 2024, 6 pages.
Office Action for Chinese Application No. 202080062596.1 dated Mar. 22, 2024, 22 pages.
Office Action for Indonesian Application No. P00202200920 dated Feb. 18, 2025, 6 pages.
Office Action for Korean Application No. 10-2021-7042567 dated Aug. 16, 2024, 10 pages.
Office Action for Vietnamese Application No. 1-2022-00626 dated Sep. 23, 2025, 4 pages.
Office Action for Vietnamese Application No. 1-2022-00626 dated Sep. 9, 2024, 4 pages.
Outgoing—ISA/210—International Search Report Mailed on Sep. 29, 2020 for WO Application No. PCT/KR20/008798, 5 page(s).
Outgoing Written Opinion of the ISA Mailed on Sep. 29, 2020 for WO Application No. PCT/KR20/008798, 9 page (s).
Written Decision on Registration for Korean Application No. 10-2021-7042567 dated Mar. 19, 2025, 6 pages.
First Examination Report for Indian Application No. 202218060556 dated Apr. 29, 2026, 6 pages.

* cited by examiner

180

181

ORIGINAL PICTURE

PREDICTION MODE DETERMINATION UNIT

PREDICTION MODE INFORMATION
INFORMATION ON MOTION INFORMATION

182

MOTION INFORMATION DERIVATION UNIT

REFERENCE PICTURE

PREDICTION SAMPLE

183

PREDICTION SAMPLE DERIVATION UNIT

INTER PREDICTION UNIT

VIDEO ENCODING/DECODING METHOD AND DEVICE FOR DERIVING WEIGHT INDEX FOR BIDIRECTIONAL PREDICTION OF MERGE CANDIDATE, AND METHOD FOR TRANSMITTING BITSTREAM

This application is a Continuation application of U.S. patent application Ser. No. 17/564,640, filed on Dec. 29, 2021, now allowed, which is a Continuation of International Application No. PCT/KR2020/008798, filed on Jul. 6, 2020, which claims the benefit of U.S. Provisional Application No. 62/871,067, filed on Jul. 5, 2019, and U.S. Provisional Application No. 62/884,658, filed on Aug. 8, 2019 the contents of which are all hereby incorporated by reference herein in their entirety.

TECHNICAL FIELD

The present disclosure relates to an image encoding/decoding method and apparatus and a method of transmitting a bitstream, and, more particularly, to an image encoding/decoding method and apparatus for deriving a weight index for bi-prediction of a merge candidate, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for deriving a weight index for bi-prediction of a merge candidate.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise constructing an affine merge candidate list for a current block, based on an inter prediction mode of the current block being an affine merge mode, selecting one affine merge candidate from the affine merge candidate list, deriving motion information of the current block based on motion information of the selected affine merge candidate, generating a prediction block of the current block based on the motion information of the current block, and reconstructing the current block based on the prediction block of the current block. The constructing the affine merge candidate list may comprise deriving a constructed affine merge candidate, and the deriving the constructed affine merge candidate may comprise deriving a weight index for bi-prediction of the constructed affine merge candidate.

In the image decoding method according to the present disclosure, the deriving the constructed affine merge candidate may be performed based on motion information of each control point (CP) included in a combination of predefined CPs among a plurality of CPs of the current block.

In the image decoding method according to the present disclosure, the information of the CP may be derived based on motion information of a candidate block for the CP, and the candidate block may be an available candidate block among at least one candidate block for the CP.

In the image decoding method according to the present disclosure, the motion information of the CP may comprise a weight index for bi-prediction, and the weight index for bi-prediction may be derived based on the CP being a top-left CP or top-right CP of the current block.

In the image decoding method according to the present disclosure, the motion information of the CP may comprise a weight index for bi-prediction, and the weight index for bi-prediction may not be derived based on the CP being a bottom-left CP or bottom-right CP of the current block.

In the image decoding method according to the present disclosure, the CP may be determined to be unavailable based on an available candidate block among at least one candidate block for the CP being not present.

In the image decoding method according to the present disclosure, the deriving the constructed affine merge candidate may be performed based on all CPs included in the combination of the predefined CPs being available.

In the image decoding method according to the present disclosure, the predefined CPs may have a predetermined order in the combination, and a weight index of the constructed affine merge candidate may be derived based on the order in the combination of the predefined CPs.

In the image decoding method according to the present disclosure, the weight index of the constructed affine merge candidate may be derived based on whether a prediction direction for the combination is available, and whether the prediction direction for the combination is available is derived based on motion information of the CPs included in the combination.

In the image decoding method according to the present disclosure, based on whether the prediction direction for the combination being available for both an L0 direction and an L1 direction, the weight index of the constructed affine merge candidate may be derived as a weight index of a predetermined CP in the combination.

In the image decoding method according to the present disclosure, a predetermined CP in the combination used to derive the weight index of the constructed affine merge candidate may be a first CP among the CPs in the combination.

In the image decoding method according to the present disclosure, based on whether the prediction direction for the combination being unavailable for at least one of the L0 direction or the L1 direction, the weight index of the constructed affine merge candidate may be derived as a predetermined weight index.

An image decoding apparatus according to another aspect of the present disclosure may comprise a memory and at least one processor. The at least one processor may construct an affine merge candidate list for a current block, based on an inter prediction mode of the current block being an affine merge mode, select one affine merge candidate from the affine merge candidate list, derive motion information of the current block based on motion information of the selected affine merge candidate, generate a prediction block of the current block based on the motion information of the current block, and reconstruct the current block based on the prediction block of the current block. The constructing the affine merge candidate list may comprise deriving a constructed affine merge candidate, and the deriving the constructed affine merge candidate may comprise deriving a weight index for bi-prediction of the constructed affine merge candidate.

An image encoding method according to another aspect of the present disclosure may comprise generating a prediction block of a current block based on motion information of the current block, encoding the current block based on the prediction block, and encoding motion information of the current block. The encoding the motion information of the current block may comprise constructing an affine merge candidate list for the current block, based on an inter prediction mode of the current block being an affine merge mode, and encoding the motion information of the current block based on the affine merge candidate list. The constructing the affine merge candidate list may comprise deriving a constructed affine merge candidate, and the deriving the constructed affine merge candidate may comprise deriving a weight index for bi-prediction of the constructed affine merge candidate.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus for deriving a weight index for bi-prediction of a merge candidate.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 18 is a view illustrating a method of deriving a motion vector field according to a subblock based TMVP mode.

FIG. 19 is a flowchart illustrating a method of deriving a constructed affine merge candidate according to another embodiment of the present disclosure.

FIG. 22 is a view exemplarily illustrating a method of deriving a weight index of a constructed affine merge candidate according to the embodiment of FIG. 21.

MODE FOR INVENTION

Figure 1:
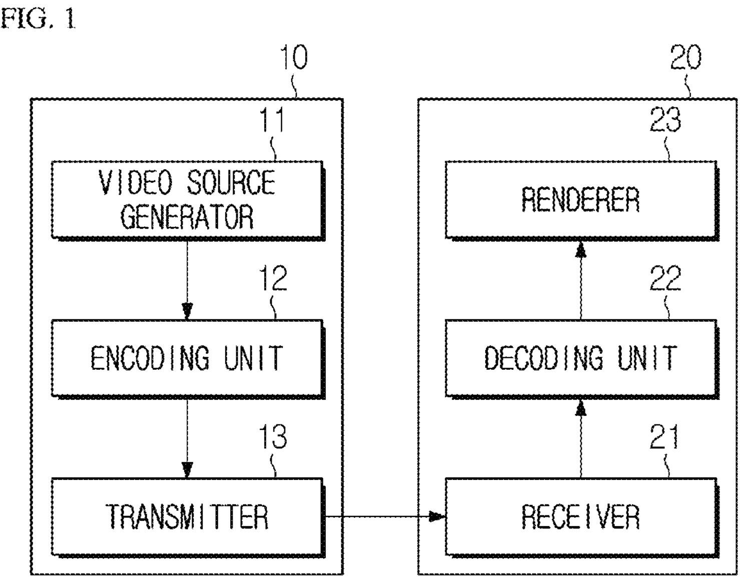
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
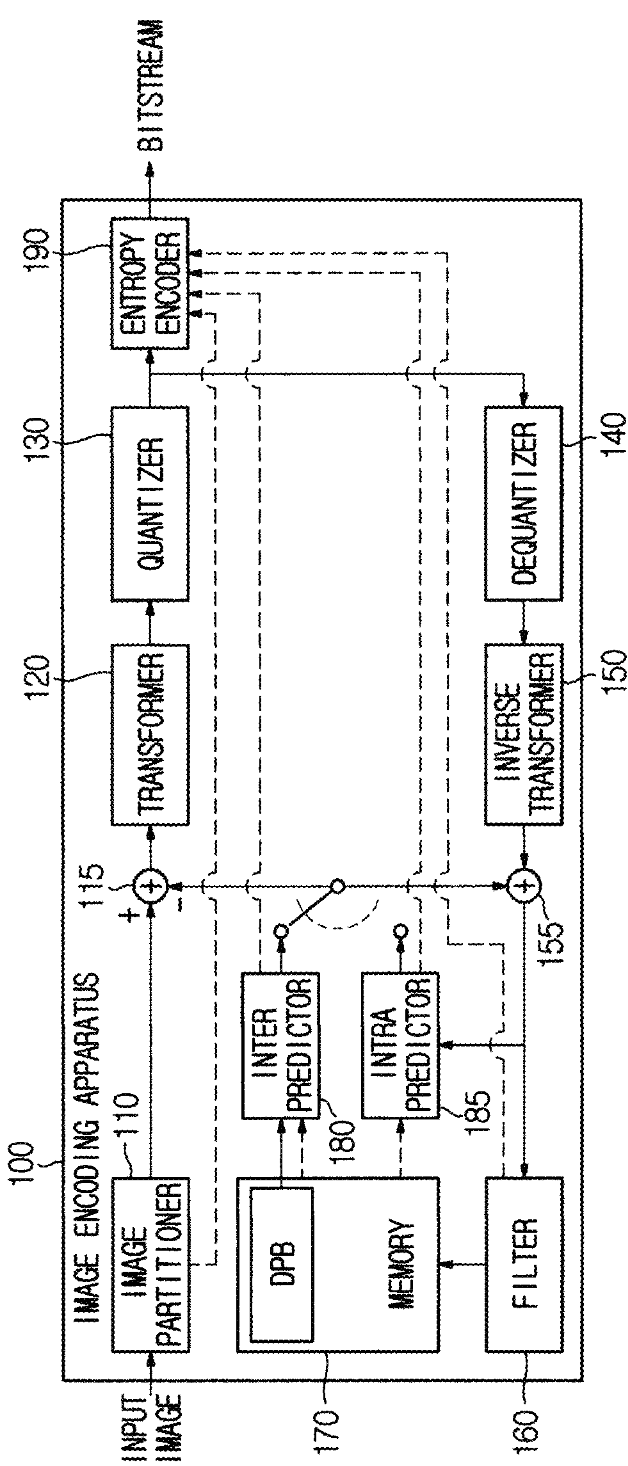
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
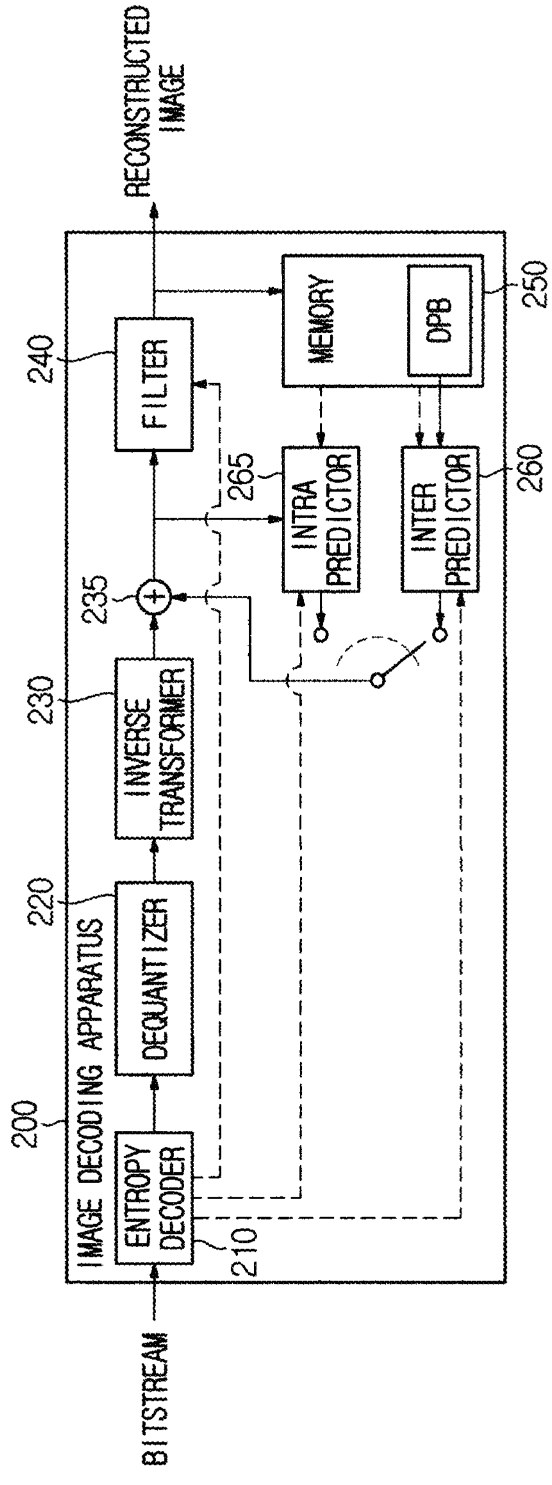
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, as described below, luma mapping with chroma scaling (LMCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Hereinafter, inter prediction encoding and inter prediction decoding will be described with reference to FIGS. 4 to 7.

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figures 4, 5:
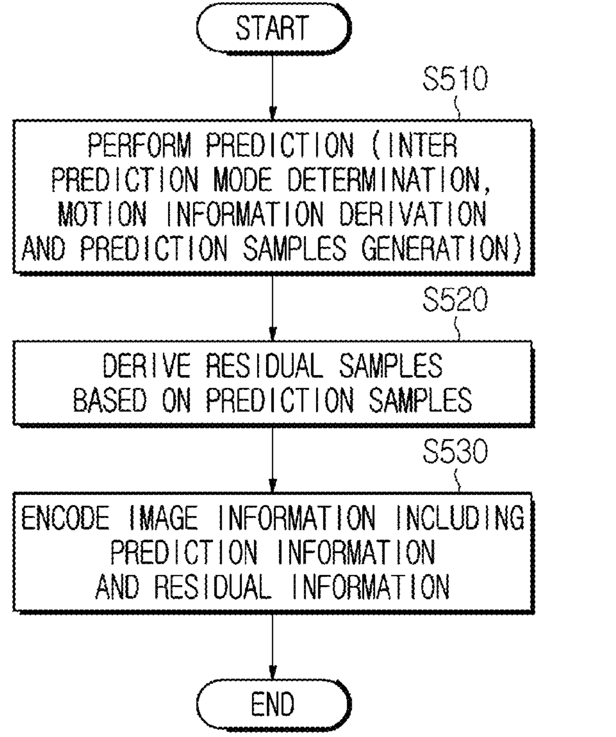
FIG. 4 is a view exemplarily illustrating a configuration of an inter prediction unit for performing inter prediction encoding according to the present disclosure.
FIG. 5 is a flowchart illustrating an inter prediction based encoding method.

FIG. 4 is a view exemplarily illustrating a configuration of an inter prediction unit for performing inter prediction encoding according to the present disclosure.

For example, the inter prediction unit shown in FIG. 4 may correspond to the inter prediction unit 180 of the image encoding apparatus of FIG. 2. The inter prediction unit 180 according to the present disclosure may include a prediction mode determination unit 181, a motion information derivation unit 182 and a prediction sample derivation unit 183. The prediction mode determination unit 181 may determine a prediction mode of a current block within an original picture. The motion information derivation unit 182 may derive motion information of the current block. The prediction sample derivation unit 183 may derive prediction samples by performing inter prediction on the current block. The prediction samples may be expressed as the prediction block of the current block. The inter prediction unit may output information on the prediction mode, information on the motion information and the prediction samples.

For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM).

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

FIG. 5 is a flowchart illustrating an inter prediction based encoding method.

For example, the encoding method of FIG. 5 may be performed by the image encoding apparatus of FIG. 2. Specifically, step S510, step S520 and step S530 may be performed by the inter prediction unit 180, the residual processor (e.g., subtractor) and the entropy encoder 190, respectively. In this case, prediction information and residual information to be encoded may be derived by the inter prediction unit 180 and the residual processor, respectively. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

In step S510, the image encoding apparatus may perform inter prediction on the current block. The image encoding apparatus may derive an inter prediction mode for the current block and motion information of the current block, by performing inter prediction, and generate prediction samples of the current block. Here, inter prediction mode determination, motion information derivation and prediction samples generation procedures may be simultaneously performed or any one thereof may be performed before the other procedures.

In step S510, the image encoding apparatus may derive residual samples based on the prediction samples. The image encoding apparatus may derive the residual samples through comparison between original samples of the current block and the prediction samples. For example, the residual sample may be derived by subtracting a corresponding prediction sample from an original sample.

In step S520, the image encoding apparatus may encode image information including prediction information and residual information. The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 6:
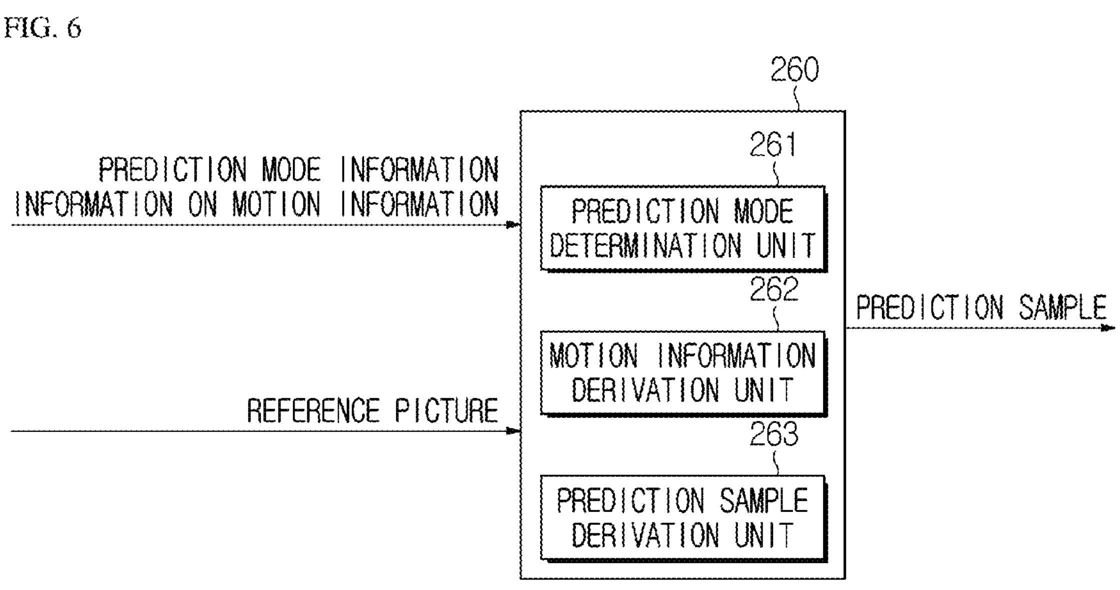
FIG. 6 is a view exemplarily illustrating a configuration of an inter prediction unit for performing inter prediction decoding according to the present disclosure.

FIG. 6 is a view exemplarily illustrating a configuration of an inter prediction unit for performing inter prediction decoding according to the present disclosure.

For example, the inter prediction unit shown in FIG. 6 may correspond to the inter prediction unit 260 of the image decoding apparatus of FIG. 3. The inter prediction unit 260 according to the present disclosure may include a prediction mode determination unit 261, a motion information derivation unit 262 and a prediction sample derivation unit 263. The inter prediction unit 260 may receive, as input, information on the prediction mode of the current block, information on the motion information of the current block and a reference picture to be used for inter prediction. The prediction mode determination 261 may determine the prediction mode of the current block based on the information on the prediction mode. The motion information derivation unit 262 may derive motion information (motion vector and/or reference picture index) of the current block based on the information on the motion information. The prediction sample derivation unit 263 may derive prediction samples by performing inter prediction on the current block. The prediction samples may be expressed as the prediction block of the current block. The inter prediction unit 260 may output the derived prediction samples.

Figure 7:
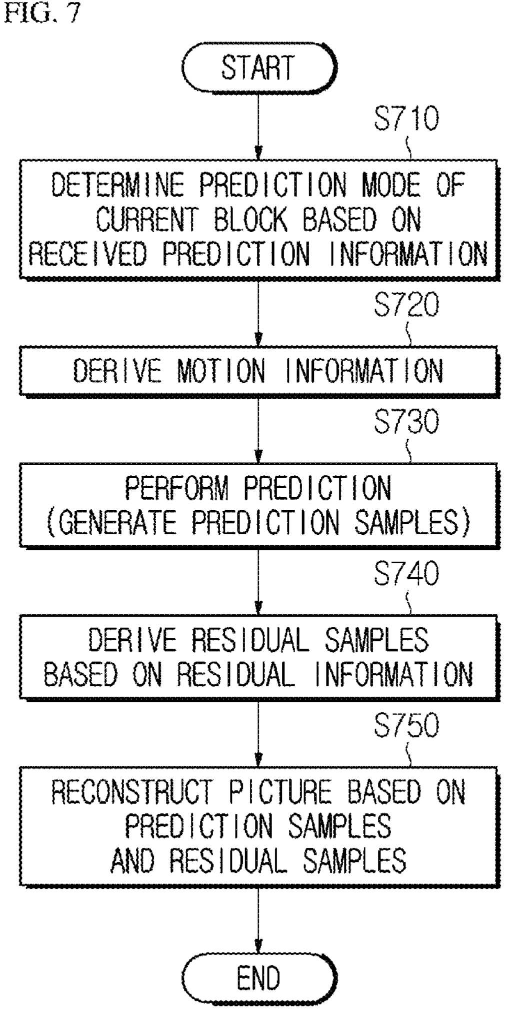
FIG. 7 is a flowchart illustrating an inter prediction based decoding method.

FIG. 7 is a flowchart illustrating an inter prediction based decoding method.

For example, the decoding method of FIG. 7 may be performed by the image decoding apparatus of FIG. 3. The image decoding apparatus may perform operation corresponding to operation performed by the image encoding apparatus. The image decoding apparatus may perform prediction with respect to a current block based on received prediction information and derive prediction samples.

Specifically, steps S710 to S730 may be performed by the inter prediction unit 260, and the prediction information of step S710 and the residual information of step S740 may be obtained from a bitstream by the entropy decoder 210. Step S740 may be performed by the residual processor of the image decoding apparatus. Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S750 may be performed by the adder 235 or the reconstructor.

In step S710, the image decoding apparatus may determine the prediction mode of the current block based on the received prediction information. The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

In step S720, the image decoding apparatus may derive the motion information of the current block based on the determined inter prediction mode. For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

In step S730, the image decoding apparatus may generate prediction samples of the current block based on motion information of the current block. In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

In step S740, the image decoding apparatus may generate residual samples of the current block based the received residual information.

In step S750, the image decoding apparatus may generate the reconstructed samples of the current block based on the prediction samples and the residual samples and generate a reconstructed picture based on this. Thereafter, an in-loop filtering procedure is applicable to the reconstructed picture as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information indicating that the merge mode is used and candidate selection information (e.g., a merge index) indicating which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figures 8, 9:
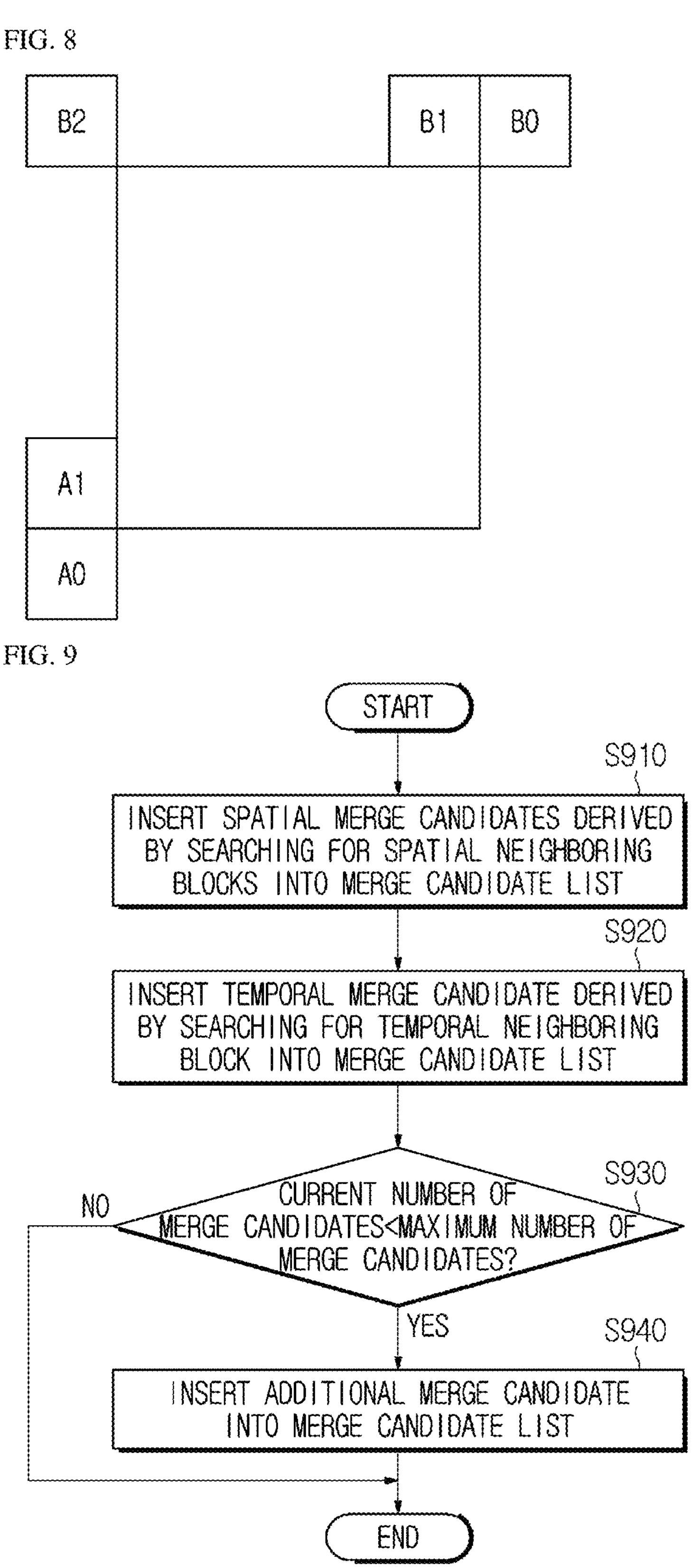
FIG. 8 is a view illustrating neighboring blocks available as a spatial merge candidate.
FIG. 9 is a view schematically illustrating a merge candidate list construction method according to an example of the present disclosure.

FIG. 8 is a view illustrating neighboring blocks available as a spatial merge candidate.

As shown in FIG. 8, spatial neighboring blocks which may be used as spatial merge candidates may include a bottom-left corner neighboring blocks A0, a left neighboring block A1, a top-right corner neighboring block B0, a top neighboring block B1 and a top-left corner neighboring block B2 of the current block. However, they are merely examples and, in addition to the spatial neighboring blocks shown in FIG. 8, additional neighboring blocks such as a right neighboring block, a bottom neighboring block and a bottom-right neighboring block may be further used as the spatial neighboring blocks, FIG. 9 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S910). The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 8 in order of $A_1$, $B_1$, $B_0$, $A_0$ and $B_2$ and sequentially indexing available candidates.

Hereinafter, a method of deriving a spatial candidate in the case of a merge mode and/or a skip mode will be described in greater detail. The spatial candidate may represent the above-described spatial merge candidate.

Derivation of the spatial candidate may be performed based on spatially neighboring blocks. For example, a maximum of four spatial candidates may be derived from candidate blocks existing at positions shown in FIG. 8. The order of deriving spatial candidates may be A1->B1->B0->A0->B2. However, the order of deriving spatial candidates is not limited to the above order and may be, for example, B1->A1->B0->A0->B2. The last position in the order (position B2 in the above example) may be considered when at least one of the preceding four positions (A1, B1, B0 and A0 in the above example) is not available. In this case, a block at a predetermined position being not available may include a corresponding block belonging to a slice or tile different from the current block or a corresponding block being an intra-predicted block. When a spatial candidate is derived from a first position in the order (A1 or B1 in the above example), redundancy check may be performed on spatial candidates of subsequent positions. For example, when motion information of a subsequent spatial candidate is the same as motion information of a spatial candidate already included in a merge candidate list, the subsequent spatial candidate may not be included in the merge candidate list, thereby improving encoding efficiency. Redundancy check performed on the subsequent spatial candidate may be performed on some candidate pairs instead of all possible candidate pairs, thereby reducing computational complexity.

For example, when the spatial candidates are derived in order of B1->A1->B0->A0->B2, redundancy check for the spatial candidate at the position A1 may be performed only for the spatial candidate at the position B1. In addition, redundancy check for the spatial candidate at the position B0 may be performed only for the spatial candidate at the position B1. In addition, redundancy check for the spatial candidate at the position A0 may be performed only for the spatial candidate at the position A1. Finally, redundancy check for the spatial candidate at the position B2 may be performed only for the spatial candidate at the position B1 and the position A1. However, the present disclosure is not limited thereto and, even when the order of deriving the spatial candidates is changed, redundancy check may be performed only one some candidate pairs as described above.

Referring to FIG. 9 again, the image encoding/decoding apparatus may insert, into the merge candidate list, a temporal merge candidate derived by searching for temporal neighboring blocks of the current block (S920). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block (C0 block) and a bottom-right center block (C1 block) of the co-located block for the current block on the col picture. That is, first, it may be determined whether the C0 block is available and, when the C0 block is available, the temporal candidate may be derived based on the C0 block. When the C0 block is not available, the temporal candidate may be derived based on the C1 block. For example, when the C0 block is an intra-predicted block or is present outside a current CTU row, it may be determined that the C0 block is not available. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a $2^n \times 2^n$ sample unit and the coordinates of the temporal neighboring block are (xTnb, yTnb), the motion information of a prediction block located at a modified position ((xTnb>>n)<<n), (yTnb>>n)<<n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position ((xTnb>>4)<<4), (yTnb>>4)<<4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position ((xTnb>>3)<<3), (yTnb>>3)<<3)) may be used for the temporal merge candidate.

Hereinafter, a method of deriving a temporal candidate in the case of a merge mode and/or a skip mode will be described in greater detail. The temporal candidate may represent the above-described temporal merge candidate. In addition, the motion vector of the temporal candidate may correspond to the temporal candidate of an MVP mode.

In the case of the temporal candidate, only one candidate may be included in a merge candidate list. In the process of deriving the temporal candidate, the motion vector of the temporal candidate may be scaled. For example, the scaling may be performed based on a collocated block (CU) (hereinafter referred to as a "col block") belonging to a collocated reference picture (colPic) (hereinafter referred to as "col picture"). More specifically, the scaling may be performed based on a distance tb between the reference picture of the current block and the current picture and a distance td between the reference picture of the col block and the col picture. tb and td may represent a value corresponding to a difference in picture order count (POC) between pictures. A reference picture list used to derive the col block may be explicitly signaled in a slice header.

Referring to FIG. 9 again, the image encoding/decoding apparatus may check whether the current number of merge candidates is less than a maximum number of merge candidates (S930). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S940 may not be performed.

When the current number of merge candidates is less than the maximum number of merge candidates as a checked result of step S930, the image encoding/decoding apparatus may derive an additional merge candidate according to a predetermined method and then insert the additional merge candidate to the merge candidate list (S940). The additional merge candidate may include, for example, at least one of history based merge candidate(s), pair-wise average merge candidate(s), ATMVP, combined bi-predictive merge candidate(s) (when a slice/tile group type of a current slice/tile group is a B type) and/or zero vector merge candidate(s).

When the current number of merge candidates is not less than the maximum number of merge candidates as a checked result of step S930, the image encoding/decoding apparatus may end the construction of the merge candidate list. In this case, the image encoding apparatus may select an optimal merge candidate from among the merge candidates configuring the merge candidate list, and signal candidate selection information (e.g., merge candidate index or merge index) indicating the selected merge candidate to the image decoding apparatus. The image decoding apparatus may select the optimal merge candidate based on the merge candidate list and the candidate selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples. The above skip mode may apply, for example, when the value of cu_skip_flag is 1.

Hereinafter, a method of deriving a history-based candidate in the case of a merge mode and/or a skip mode will be described. The history-based candidate may be expressed by a history-based merge candidate.

The history-based candidate may be added to a merge candidate list after a spatial candidate and a temporal candidate are added to the merge candidate list. For example, motion information of a previously encoded/decoded block may be stored at a table and used as a history-based candidate of a current block. The table may store a plurality of history-based candidates during the encoding/decoding process. The table may be initialized when a new CTU row starts. Initializing the table may mean that the corresponding table is emptied by deleting all the history-based candidates stored in the table. Whenever there is an inter-predicted block, related motion information may be added to the table as a last entry. In this case, the inter-predicted block may not be a block predicted based on a subblock. The motion information added to the table may be used as a new history-based candidate.

The table of the history-based candidates may have a predetermined size. For example, the size may be 5. In this case, the table may store a maximum of five history-based candidates. When a new candidate is added to the table, a limited first-in-first-out (FIFO) rule in which redundancy check of checking whether the same candidate is present in the table may apply. If the same candidate is already present in the table, the same candidate may be deleted from the table and positions of all subsequent history-based candidates may be moved forward.

The history-based candidate may be used in a process of configuring the merge candidate list. In this case, the history-based candidates recently included in the table may be sequentially checked and located at a position after the temporal candidate of the merge candidate list. When the history-based candidate is included in the merge candidate list, redundancy check with the spatial candidates or temporal candidates already included in the merge candidate list may be performed. If the spatial candidate or temporal candidate already included in the merge candidate list and the history-based candidate overlap, the history-based candidate may not be included in the merge candidate list. By simplifying the redundancy check as follows, the amount of computation may be reduced.

The number of history-based candidates used to generate the merge candidate list may be set to $(N<=4)?M:(8-N)$. In this case, N may denote the number of candidates already included in the merge candidate list, and M may denote the number of available history-based candidate included in the table. That is, when 4 or less candidates are included in the merge candidate list, the number of history-based candidates used to generate the merge candidate list may be M, and, when N candidates greater than 4 are included in the merge candidate list, the number of history-based candidates used to generate the merge candidate list may be set to $(8-N)$.

When the total number of available merge candidates reaches (maximum allowable number of merge candidates—1), configuration of the merge candidate list using the history-based candidate may end.

Hereinafter, a method of deriving a pair-wise average candidate in the case of a merge mode and/or a skip mode will be described. The pair-wise average candidate may be represented by a pair-wise average merge candidate or a pair-wise candidate.

The pair-wise average candidate may be generated by obtaining predefined candidate pairs from the candidates included in the merge candidate list and averaging them. The predefined candidate pairs may be {(0, 1), (0, 2), (1, 2), (0, 3), (1, 3), (2, 3)} and the number configuring each candidate pair may be an index of the merge candidate list. That is, the predefined candidate pair (0, 1) may mean a pair of index 0 candidate and index 1 candidate of the merge candidate list, and the pair-wise average candidate may be generated by an average of index 0 candidate and index 1 candidate. Derivation of pair-wise average candidates may be performed in the order of the predefined candidate pairs. That is, after deriving a pair-wise average candidate for the candidate pair (0, 1), the process of deriving the pair-wise average candidate may be performed in order of the candidate pair (0, 2) and the candidate pair (1, 2). The pair-wise average candidate derivation process may be performed until configuration of the merge candidate list is completed. For example, the pair-wise average candidate derivation process may be performed until the number of merge candidates included in the merge candidate list reaches a maximum merge candidate number.

The pair-wise average candidate may be calculated separately for each reference picture list. When two motion vectors are available for one reference picture list (L0 list or L1 list), an average of the two motion vectors may be computed. In this case, even if the two motion vectors indicate different reference pictures, an average of the two motion vectors may be performed. If only one motion vector is available for one reference picture list, an available motion vector may be used as a motion vector of a pair-wise average candidate. If both the two motion vectors are not available for one reference picture list, it may be determined that the reference picture list is not valid.

When configuration of the merge candidate list is not completed even after the pair-wise average candidate is included in the merge candidate list, a zero vector may be added to the merge candidate list until the maximum merge candidate number is reached.

When applying an MVP mode to the current block, a motion vector predictor (mvp) candidate list may be generated using a motion vector of a reconstructed spatial neighboring block (e.g., the neighboring block shown in FIG. 8) and/or a motion vector corresponding to the temporal neighboring block (or Col block). That is, the motion vector of the reconstructed spatial neighboring blocks and the motion vector corresponding to the temporal neighboring blocks may be used as motion vector predictor candidates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image decoding apparatus may obtain or derive a reference picture index indicating a reference picture from the information on prediction.

Figures 10, 11:
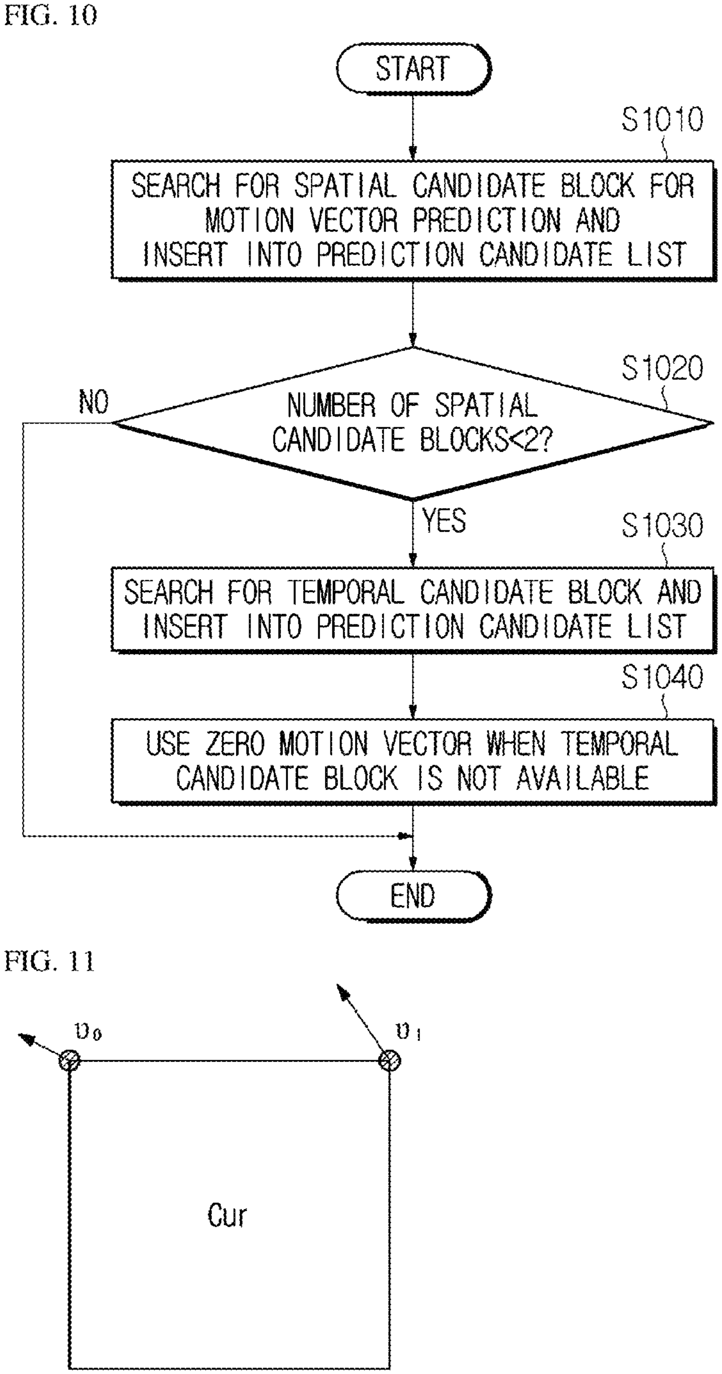
FIG. 10 is a view schematically illustrating a motion vector predictor candidate list configuration method according to an example of the present disclosure.
FIG. 11 is a view illustrating a 4-parameter model of an affine mode.

FIG. 10 is a view schematically illustrating a motion vector predictor candidate list construction method according to an example of the present disclosure.

First, a spatial candidate block of a current block may be searched for and available candidate blocks may be inserted into an MVP candidate list (S1010). Thereafter, it is determined whether the number of MVP candidates included in the MVP candidate list is less than 2 (S1020) and, when the number of MVP candidates is two, construction of the MVP candidate list may be completed.

In step S1020, when the number of available spatial candidate blocks is less than 2, a temporal candidate block of the current block may be searched for and available candidate blocks may be inserted into the MVP candidate list (S1030). When the temporal candidate blocks are not available, a zero motion vector may be inserted into the MVP candidate list (S1040), thereby completing construction of the MVP candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi-prediction, both information on refidxL0 and information on refidxL1 may be signaled.

As described above, when applying the MVP mode, information on MVP derived by the image encoding apparatus may be signaled to the image decoding apparatus. Information on the MVD may include, for example, an MVD absolute value and information indicating x and y components for a sign. In this case, when the MVD absolute value is greater than 0, whether the MVD absolute value is greater than 1 and information indicating an MVD remainder may be signaled stepwise. For example, information indicating whether the MVD absolute value is greater than 1 may be signaled only when a value of flag information indicating whether the MVD absolute value is greater than 0 is 1.

Hereinafter, an affine mode which is an example of an inter prediction mode will be described in detail. In a conventional video encoding/decoding system, only one motion vector is used to express motion information of a current block. However, in this method, there is a problem in that optimal motion information is only expressed in units of blocks, but optimal motion information cannot be expressed in units of pixels. In order to solve this problem, an affine mode defining motion information of a block in units of pixels has been proposed. According to the affine mode, a motion vector for each pixel and/or subblock unit of a block may be determined using two to four motion vectors associated with a current block.

Compared to the existing motion information expressed using translation motion (or displacement) of a pixel value, in the affine mode, motion information for each pixel may be expressed using at least one of translation motion, scaling, rotation or shear. Among them, an affine mode in which motion information for each pixel is expressed using displacement, scaling or rotation may be similarity or simplified affine mode. The affine mode in the following description may mean a similarity or simplified affine mode.

Motion information in the affine mode may be expressed using two or more control point motion vectors (CPMVs). A motion vector of a specific pixel position of a current block may be derived using a CPMV. In this case, a set of motion vectors for each pixel and/or subblock of a current block may be defined as an affine motion vector field (affine MVF).

FIG. 11 is a view illustrating a 4-parameter model of an affine mode.

Figures 12, 13:
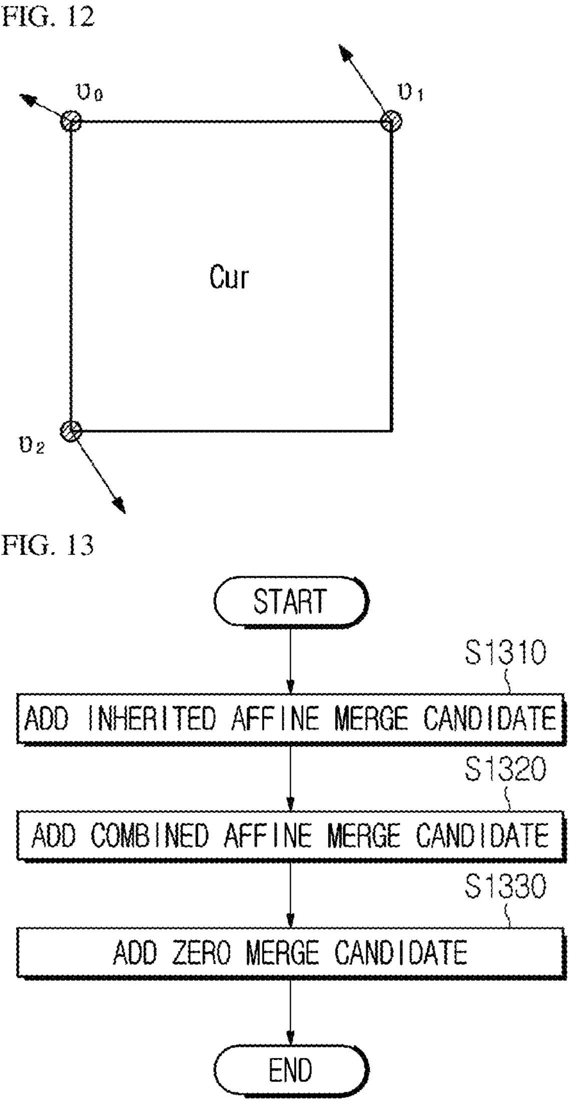
FIG. 12 is a view illustrating a 6-parameter model of an affine mode.
FIG. 13 is a view illustrating a method of generating an affine merge candidate list.

FIG. 12 is a view illustrating a 6-parameter model of an affine mode.

When an affine mode applies to a current block, an affine MVF may be derived using one of a 4-parameter model and a 6-parameter model. In this case, the 4-parameter model may mean a model type in which two CPMVs $v_0$ and $v_1$ are used, as shown in FIG. 11. In addition, the 6-parameter model may mean a model type in which three CPMVs $v_0$, $v_1$ and $v_2$ are used, as shown in FIG. 12.

When the position of the current block is (x, y), a motion vector according to the pixel position may be derived according to Equation 1 or 2 below. For example, the motion vector according to the 4-parameter model may be derived according to Equation 1 and the motion vector according to the 6-parameter model may be derived according to Equation 2.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 1]}$$

-continued $$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{[Equation 2]}$$

In Equations 1 and 2, mv0={mv_0x, mv_0y} may be a CPMV at the top left corner position of the current block, v1={mv_1x, mv_1y} may be a CPMV at the top right position of the current block, and mv2={mv_2x, mv_2y} may be a CPMV at the bottom left position of the current block. In this case, W and H respectively correspond to the width and height of the current block, and mv={mv_x, mv_y} may mean a motion vector of a pixel position {x, y}.

In an encoding/decoding process, an affine MVF may be determined in units of pixels and/or predefined subblocks. When the affine MVF is determined in units of pixels, a motion vector may be derived based on each pixel value. Meanwhile, when the affine MVF is determined in units of subblocks, a motion vector of a corresponding block may be derived based on a center pixel value of a subblock. The center pixel value may mean a virtual pixel present in the center of a subblock or a bottom right pixel among four pixels present in the center. In addition, the center pixel value may be a specific pixel in a subblock and may be a pixel representing the subblock. In the present disclosure, the case where the affine MVF is determined in units of 4×4 subblocks will be described. However, this is only for convenience of description and the size of the subblock may be variously changed.

That is, when affine prediction is available, a motion model applicable to a current block may include three models, that is, a translational motion model, a 4-parameter affine motion model and 6-parameter affine motion model. Here, the translational motion model may represent a model used by an existing block unit motion vector, the 4-parameter affine motion model may represent a model used by two CPMVs, and the 6-parameter affine motion model may represent a model used by three CPMVs. The affine mode may be divided into detailed modes according to a method of encoding/decoding motion information. For example, the affine mode may be subdivided into an affine MVP mode and an affine merge mode.

When an affine merge mode applies to a current block, a CPMV may be derived from neighboring blocks of the current block encoded/decoded in the affine mode. When at least one of the neighboring blocks of the current block is encoded/decoded in the affine mode, the affine merge mode may apply to the current block. That is, when the affine merge mode applies to the current block, CPMVs of the current block may be derived using CPMVs of the neighboring blocks. For example, the CPMVs of the neighboring blocks may be determined to be the CPMVs of the current block or the CPMV of the current block may be derived based on the CPMVs of the neighboring blocks. When the CPMV of the current block is derived based on the CPMVs of the neighboring blocks, at least one of coding parameters of the current block or the neighboring blocks may be used. For example, CPMVs of the neighboring blocks may be modified based on the size of the neighboring blocks and the size of the current block and used as the CPMVs of the current block.

Meanwhile, affine merge in which an MV is derived in units of subblocks may be referred to as a subblock merge mode, which may be specified by merge_subblock_flag having a first value (e.g., 1). In this case, an affine merging candidate list described below may be referred to as a subblock merging candidate list. In this case, a candidate derived as SbTMVP described below may be further included in the subblock merging candidate list. In this case, the candidate derived as sbTMVP may be used as a candidate of index #0 of the subblock merging candidate list. In other words, the candidate derived as sbTMVP may be located in front of an inherited affine candidates and constructed affine candidates described below in the subblock merging candidate list.

For example, an affine mode flag specifying whether an affine mode is applicable to a current block may be defined, which may be signaled at least one of higher levels of the current block, such as a sequence, a picture, a slice, a tile, a tile group, a brick, etc. For example, the affine mode flag may be named sps_affine_enabled_flag.

When the affine merge mode applies, an affine merge candidate list may be configured to derive the CPMV of the current block. In this case, the affine merge candidate list may include at least one of an inherited affine merge candidate, a constructed affine merge candidate or a zero merge candidate. The inherited affine merge candidate may mean a candidate derived using the CPMVs of the neighboring blocks when the neighboring blocks of the current block are encoded/decoded in the affine mode. The constructed affine merge candidate may mean a candidate having each CPMV derived based on motion vectors of neighboring blocks of each control point (CP). Meanwhile, the zero merge candidate may mean a candidate composed of CPMVs having a size of 0. In the following description, the CP may mean a specific position of a block used to derive a CPMV. For example, the CP may be each vertex position of a block.

FIG. 13 is a view illustrating a method of generating an affine merge candidate list.

Referring to the flowchart of FIG. 13, affine merge candidates may be added to the affine merge candidate list in order of an inherited affine merge candidate (S1310), a constructed affine merge candidate (S1320) and a zero merge candidate (S1330). The zero merge candidate may be added when the number of candidates included in the candidate list does not satisfy a maximum number of candidates even though all the inherited affine merge candidates and the constructed affine merge candidates are added to the affine merge candidate list. In this case, the zero merge candidate may be added until the number of candidates of the affine merge candidate list satisfies the maximum number of candidates.

Figure 14:
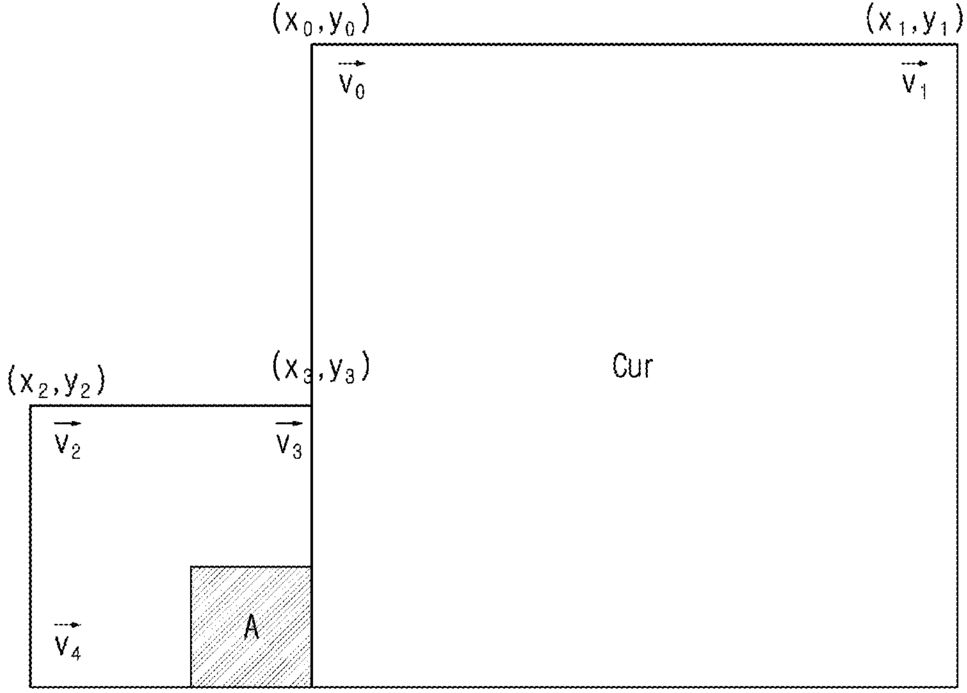
FIG. 14 is a view illustrating a CPMV derived from a neighboring block.

FIG. 14 is a view illustrating a method of controlling inherited affine merge candidate from a neighboring block.

For example, a maximum of two inherited affine merge candidates may be derived, each of which may be derived based on at least one of left neighboring blocks and top neighboring blocks. Neighboring blocks for deriving the inherited affine merge mode will be described with reference to FIG. 8. An inherited affine merge candidate derived based on a left neighboring block is derived based on at least one of A0 or A1, and an inherited affine merge candidate derived based on a top neighboring block may be derived based on at least one of B0, B1 or B2. In this case, the scan order of the neighboring blocks may be A0 to A1 and B0, B1 and B2, but is not limited thereto. For each of the left and top, an inherited affine merge candidates may be derived based on an available first neighboring block in the scan order. In this case, redundancy check may not be performed between candidates derived from the left neighboring block and the top neighboring block.

For example, as shown in FIG. 14, when a left neighboring block A is encoded/decoded in the affine mode, at least one of motion vectors v2, v3 and v4 corresponding to the CP of the neighboring block A may be derived. When the neighboring block A is encoded/decoded through a 4-parameter affine model, the inherited affine merge candidate may be derived using v2 and v3. In contrast, When the neighboring block A is encoded/decoded through a 6-parameter affine model, the inherited affine merge candidate may be derived using v2, v3 and v4.

Figure 15:
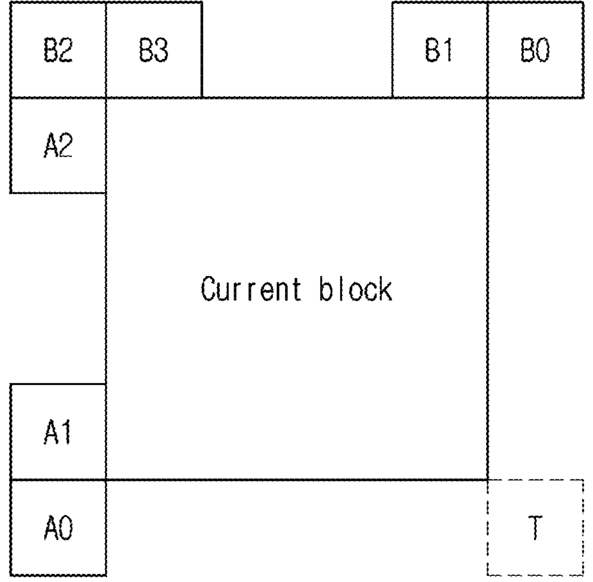
FIG. 15 is a view illustrating neighboring blocks for deriving a constructed affine merge candidate.

FIG. 15 is a view illustrating neighboring blocks for deriving a constructed affine merge candidate.

The constructed affine candidate may mean a candidate having a CPMV derived using a combination of general motion information of neighboring blocks. Motion information for each CP may be derived using spatial neighboring blocks or temporal neighboring blocks of the current block. In the following description, CPMVk may mean a motion vector representing a k-th CP. For example, referring to FIG. 15, CPMV1 may be determined to be an available first motion vector of motion vectors of B2, B3 and A2, and, in this case, the scan order may be B2, B3 and A2. CPMV2 may be determined to be an available first motion vector of motion vectors of B1 and B0, and, in this case, the scan order may be B1 and B0. CPMV3 may be determined to be one of motion vectors of A1 and A0, and, in this case, the scan order may be A1 and A0. When TMVP is applicable to the current block, CPMV4 may be determined as a motion vector of T which is a temporal neighboring block.

After four motion vectors for each CP are derived, a constructed affine merge candidate may be derived based on this. The constructed affine merge candidate may be configured by including at least two motion vectors selected from among the derived four motion vectors for each CP. For example, the constructed affine merge candidate may be composed of at least one of {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2} or {CPMV1, CPMV3} in this order. A constructed affine candidate composed of three motion vectors may be a candidate for a 6-parameter affine model. In contrast, a constructed affine candidate composed of two motion vectors may be a candidate for a 4-parameter affine model. In order to avoid the scaling process of the motion vector, when the reference picture indices of CPs are different from each other, a combination of related CPMVs may be ignored without being used to derive the constructed affine candidate.

When an affine MVP mode applies to a current block, an encoding/decoding apparatus may derive two or more CPMV predictors and CPMVs for the current block and derive CPMV differences based on them. In this case, the CPMV differences may be signaled from the encoding apparatus to the decoding apparatus. The image decoding apparatus may derive a CPMV predictor for the current block, reconstruct the signaled CPMV difference, and then derive a CPMV of the current block based on the CPMV predictor and the CPMV difference.

Meanwhile, only when the affine merge mode or a subblock-based TMVP does not apply to the current block, an affine MVP mode may apply to the current block. Meanwhile, the affine MVP mode may be expressed as an affine CP MVP mode.

When the affine MVP applies to the current block, an affine MVP candidate list may be configured to derive a CPMV for the current block. In this case, the affine MVP candidate list may include at least one of an inherited affine MVP candidate, a constructed affine MVP candidate, a translation motion affine MVP candidate or a zero MVP candidate.

In this case, the inherited affine MVP candidate may mean a candidate derived based on the CPMVs of the neighboring blocks, when the neighboring blocks of the current block are encoded/decoded in an affine mode. The constructed affine MVP candidate may mean a candidate derived by generating a CPMV combination based on a motion vector of a CP neighboring block. The zero MVP candidate may mean a candidate composed of CPMVs having a value of 0. The derivation method and characteristics of the inherited affine MVP candidate and the constructed affine MVP candidate are the same as the above-described inherited affine candidate and the constructed affine candidate and thus a description thereof will be omitted.

When the maximum number of candidates of the affine MVP candidate list is 2, the constructed affine MVP candidate, the translation motion affine MVP candidate and the zero MVP candidate may be added when the current number of candidates is less than 2. In particular, the translation motion affine MVP candidate may be derived in the following order.

For example, when the number of candidates included in the affine MVP candidate list is less than 2 and CPMV0 of the constructed affine MVP candidate is valid, CPMV0 may be used as an affine MVP candidate. That is, affine MVP candidates having all motion vectors of CP0, CP1, CP2 being CPMV0 may be added to the affine MVP candidate list.

Next, when the number of candidates of the affine MVP candidate list is less than 2 and CPMV1 of the constructed affine MVP candidate is valid, CPMV1 may be used as an affine MVP candidate. That is, affine MVP candidates having all motion vectors of CP0, CP1, CP2 being CPMV1 may be added to the affine MVP candidate list.

Next, when the number of candidates of the affine MVP candidate list is less than 2 and CPMV2 of the constructed affine MVP candidate is valid, CPMV2 may be used as an affine MVP candidate. That is, affine MVP candidates having all motion vectors of CP0, CP1, CP2 being CPMV2 may be added to the affine MVP candidate list.

Despite the above-described conditions, when the number of candidates of the affine MVP candidate list is less than 2, a temporal motion vector predictor (TMVP) of the current block may be added to the affine MVP candidate list.

Despite addition of the translation motion affine MVP candidate, when the number of candidates of the affine MVP candidate list is less than 2, the zero MVP candidate may be added to the affine MVP candidate list.

Figures 16, 17:
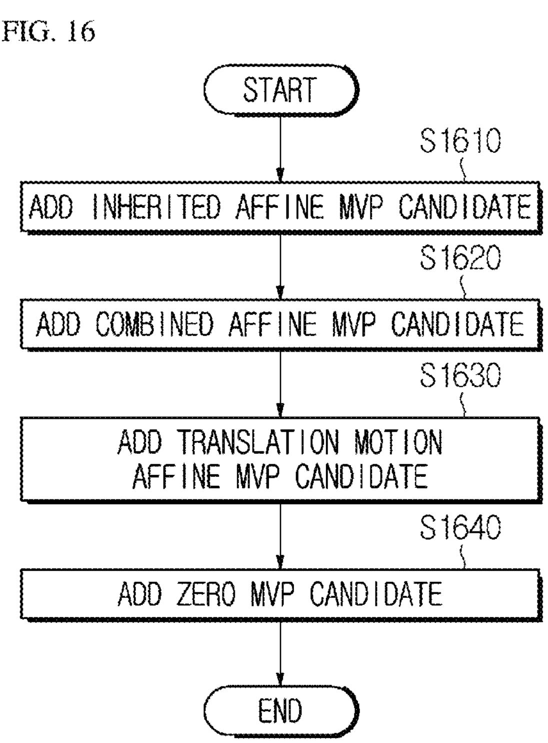
FIG. 16 is a view illustrating a method of generating an affine MVP candidate list.
FIG. 17 is a view illustrating a neighboring block in a subblock based TMVP mode.

FIG. 16 is a view illustrating a method of generating an affine MVP candidate list.

Referring to the flowchart of FIG. 16, candidates may be added to the affine MVP candidate list in order of an inherited affine MVP candidate (S1610), a constructed affine MVP candidate (S1620), a translation motion affine MVP candidate (S1630) and a zero MVP candidate (S1640). As described above, steps S1620 to S1640 may be performed depending on whether the number of candidates included in the affine MVP candidate list is less than 2 in each step.

The scan order of the inherited affine MVP candidates may be equal to the scan order of the inherited affine merge candidates. However, in the case of the inherited affine MVP candidate, only neighboring blocks referencing the same reference picture as the reference picture of the current block may be considered. When the inherited affine MVP candidate is added to an affine MVP candidate list, redundancy check may not be performed.

In order to derive the constructed affine MVP candidate, only spatial neighboring blocks shown in FIG. 15 may be considered. In addition, the scan order of the constructed affine MVP candidates may be equal to the scan order of the constructed affine merge candidates. In addition, in order to derive the constructed affine MVP candidate, a reference picture index of a neighboring block may be checked, and, in the scan order, a first neighboring block inter-coded and referencing the same reference picture as the reference picture of the current block may be used.

Hereinafter, a subblock-based TMVP mode which is an example of an inter prediction mode will be described in detail. According to the subblock-based TMVP mode, a motion vector field (MVF) for a current block may be derived and a motion vector may be derived in units of subblocks.

Unlike a conventional TMVP mode performed in units of coding units, for a coding unit to which subblock-based TMVP mode applies, a motion vector may be encoded/decoded in units of sub-coding units. In addition, according to the conventional TMVP mode, a temporal motion vector may be derived from a collocated block, but, in the subblock-based TMVP mode, a motion vector field may be derived from a reference block specified by a motion vector derived from a neighboring block of the current block. Hereinafter, the motion vector derived from the neighboring block may be referred to as a motion shift or representative motion vector of the current block.

FIG. 17 is a view illustrating neighboring blocks of a subblock based TMVP mode.

When a subblock-based TMVP mode applies to a current block, a neighboring block for determining a motion shift may be determined. For example, scan for the neighboring block for determining the motion shift may be performed in order of blocks of A1, B1, B0 and A0 of FIG. 17. As another example, the neighboring block for determining the motion shift may be limited to a specific neighboring block of the current block. For example, the neighboring block for determining the motion shift may always be determined to be a block A1. When a neighboring block has a motion vector referencing a col picture, the corresponding motion vector may be determined to be a motion shift. The motion vector determined to be the motion shift may be referred to as a temporal motion vector. Meanwhile, when the above-described motion vector cannot be derived from neighboring blocks, the motion shift may be set to (0, 0).

Figures 18, 19:
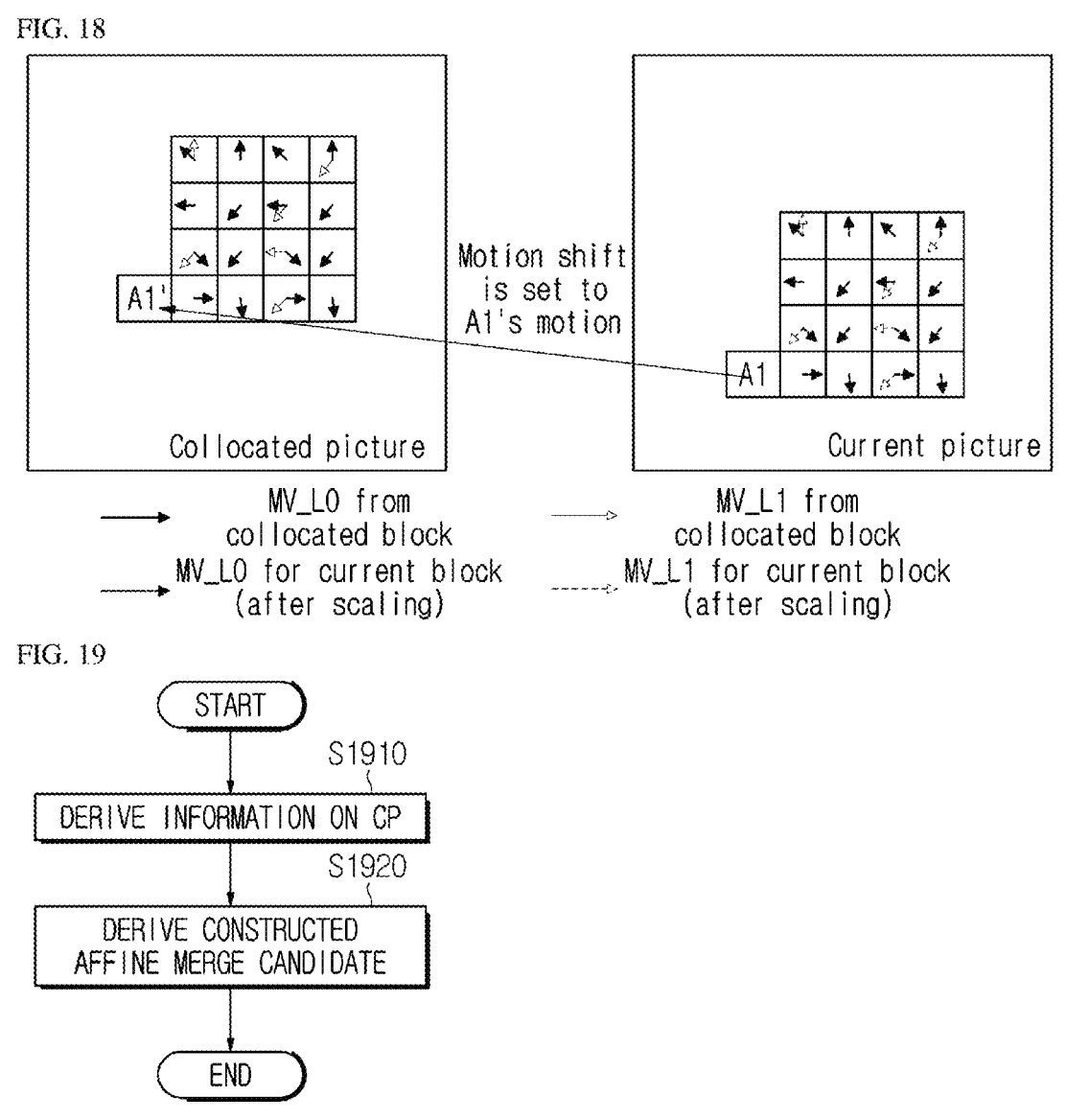

FIG. 18 is a view illustrating a method of deriving a motion vector field according to a subblock-based TMVP mode.

Next, a reference block on the collocated picture specified by a motion shift may be determined. For example, subblock based motion information (motion vector or reference picture index) may be obtained from a col picture by adding a motion shift to the coordinates of the current block. In the example shown in FIG. 18, it is assumed that the motion shift is a motion vector of A1 block. By applying the motion shift to the current block, a subblock in a col picture (col subblock) corresponding to each subblock configuring the current block may be specified. Thereafter, using motion information of the corresponding subblock in the col picture (col subblock), motion information of each subblock of the current block may be derived. For example, the motion information of the corresponding subblock may be obtained from the center position of the corresponding subblock. In this case, the center position may be a position of a bottom-right sample among four samples located at the center of the corresponding subblock. When the motion information of a specific subblock of the col block corresponding to the current block is not available, the motion information of a center subblock of the col block may be determined to be motion information of the corresponding subblock. When the motion vector of the corresponding subblock is derived, it may be switched to a reference picture index and a motion vector of a current subblock, similarly to the above-described TMVP process. That is, when a subblock based motion vector is derived, scaling of the motion vector may be performed in consideration of POC of the reference picture of the reference block.

As described above, the subblock-based TMVP candidate for the current block may be derived using the motion vector field or motion information of the current block derived based on the subblock.

Hereinafter, a merge candidate list configured in units of subblocks is defined as a subblock unit merge candidate list. The above-described affine merge candidate and subblock-based TMVP candidate may be merged to configure a subblock unit merge candidate list.

Meanwhile, a subblock-based TMVP mode flag specifying whether a subblock-based TMVP mode is applicable to a current block may be defined, which may be signaled at at least one level among higher levels of the current block such as a sequence, a picture, a slice, a tile, a tile group, a brick, etc. For example, the subblock-based TMVP mode flag may be named sps_sbtmvp_enabled_flag. When the subblock-based TMVP mode is applicable to the current block, the subblock-based TMVP candidate may be first added to the subblock unit merge candidate list and then the affine merge candidate may be added to the subblock unit merge candidate list. Meanwhile, a maximum number of candidates which may be included in the subblock unit merge candidate list may be signaled. For example, the maximum number of candidates which may be included in the subblock unit merge candidate list may be 5.

The size of a subblock used to derive the subblock unit merge candidate list may be signaled or preset to M×N. For example, M×N may be 8×8. Accordingly, only when the size of the current block is 8×8 or greater, an affine mode or a subblock-based TMVP mode is applicable to the current block.

Hereinafter, an embodiment of a prediction performing method of the present disclosure will be described. The following prediction performing method may be performed in step S510 of FIG. 5 or step S730 of FIG. 7.

A predicted block for a current block may be generated based on motion information derived according to a prediction mode. The predicted block (prediction block) may include prediction samples (prediction sample array) of the current block. When the motion vector of the current block specifies a fractional sample unit, an interpolation procedure may be performed and, through this, prediction samples of the current block may be derived based on reference samples in units of fractional samples within a reference picture. When affine inter prediction applies to the current block, prediction samples may be generated based on a sample/subblock unit MV. When bi-prediction applies, prediction samples derived through a weighted sum or weighted average (according to phase) of prediction samples derived based on L0 prediction (that is, prediction using MVL0 and a reference picture within a reference picture list L0) and prediction samples derived based on L1 prediction (that is, prediction using MLV1 and a reference picture within a reference picture list L1) may be used as the prediction samples of the current block. When applying bi-prediction and a reference picture used for L0 prediction and the reference picture used for L1 prediction are located in different temporal directions with respect to the current picture (that is, if it corresponds to bi-prediction and bi-directional prediction), this may be called true bi-prediction.

In an image decoding apparatus, reconstructed samples and a reconstructed picture may be generated based on the derived prediction samples and then an in-loop filtering procedure may be performed. In addition, in an image encoding apparatus, residual samples may be derived based on the derived prediction samples and encoding of image information including prediction information and residual information may be performed.

When bi-prediction applies to a current block as described above, prediction samples may be derived based on a weighted average. In this case, a weight for performing a weighted average may be determined based on a weight index derived at a CU level. Conventionally, the bi-prediction signal (that is, bi-prediction samples) was able to be derived through a simple average of an L0 prediction signal (L0 prediction samples) and an L1 prediction signal (L1 prediction samples). That is, bi-prediction samples was derived through an average of the L0 prediction samples based on an L0 reference picture and MVL0 and L1 prediction samples based on an L1 reference picture and MVL1. However, according to the present disclosure, when applying bi-prediction, a bi-prediction signal (bi-prediction samples) may be derived through a weighted average of the L0 prediction signal and the L1 prediction signal as shown in Equation 3. Such bi-prediction may be referred to as bi-prediction with CU-level weight (BCW).

$$P_{bi\text{-}pred} = ((8-w)*P_0 + w*P_1 + 4) \gg 3 \quad \text{[Equation 3]}$$

In Equation 3 above, $P_{bi\text{-}pred}$ denotes a bi-prediction signal (bi-prediction block) derived by a weighted average and $P_0$ and $P_1$ respectively denote L0 prediction samples (L0 prediction block) and L1 prediction samples (L1 prediction block). In addition, (8-w) and w denote weights applying to $P_0$ and $P_1$, respectively.

In generating the bi-prediction signal by the weighted average, five weights may be allowed. For example, the weight w may be selected from {−2,3,4,5,10}. For each bi-predicted CU, the weight w may be determined by one of two methods. As the first method of the two methods, when a current CU is not a merge mode (non-merge CU), a weight index may be signaled along with a motion vector difference. For example, a bitstream may include information on the weight index after information on the motion vector difference. As the second method of the two methods, when the current CU is a merge mode (merge CU), the weight index may be derived from neighboring blocks based on a merge candidate index (merge index).

Generation of the bi-prediction signal by the weighted average may be limited to apply to only a CU having a size including 256 or more samples (luma component samples). That is, bi-prediction by the weighted average may be performed only with respect to a CU in which a product of the width and height of the current block is 256 or more. In addition, the weight w may be used as one of five weights as described above and one of different numbers of weights may be used. For example, according to the characteristics of the current image, five weights may be used for a low-delay picture and three weights may be used for a non-low-delay picture. In this case, the three weights may be {3,4,5}.

The image encoding apparatus may determine a weight index without significantly increasing complexity, by applying a fast search algorithm. In this case, the fast search algorithm may be summarized as follows. Hereinafter, an unequal weight may mean that weights applying to $P_0$ and $P_1$ are not equal. In addition, an equal weight may mean that weights applying to $P_0$ and $P_1$ may be equal.

- In the case where an AMVR mode in which resolution of a motion vector is adaptively changed is applied together, when a current picture is a low-delay picture, only the unequal weight may be conditionally checked for each of 1-pel motion vector resolution and 4-pel motion vector resolution.
- In the case where an affine mode is applied together and the affine mode is selected as an optimal mode of the current block, the image encoding apparatus may perform affine motion estimation (ME) for each unequal weight.
- When two reference pictures used for bi-prediction are equal, only an unequal weight may be conditionally checked.
- The unequal weight may not be checked when a predetermined condition is satisfied. The predetermined picture may be based on a POC distance between a current picture and a reference picture, a quantization parameter (QP), a temporal level, etc.

A weight index of BCW may be encoded using one context coded bin and one or more subsequent bypass coded bins. The first context coded bin specifies whether an equal weight is used. When an unequal weight is used, additional bins may be bypass-encoded and signaled. The additional bins may be signaled to specify which weight is used.

Weighted prediction (WP) is a tool for efficiently encoding an image including fading. According to weighted prediction, weighting parameters (weight and offset) may be signaled for each reference picture included in each of reference picture lists L0 and L1. Then, when motion compensation is performed, weight(s) and offset(s) may apply to corresponding reference picture(s). Weighted prediction and BCW may be used for different types of images. In order to avoid interaction between weighted prediction and BCW, a BCW weight index may not be signaled for a CU using weighted prediction. In this case, the weight may be inferred to be 4. That is, an equal weight may be applied.

In the case of a CU to which a merge mode applies, a weight index may be inferred from neighboring blocks based on a merge candidate index. This may apply to both a general merge mode and an inherited affine merge mode.

In the case of a constructed affine merge mode, affine motion information may be configured based on motion information of a maximum of three blocks. In this case, the following process may be performed to derive a BCW weight index for a CU using a constructed affine merge mode.

(1) First, the range of the BCW weight index {0,1,2,3,4} may be divided into three groups {0}, {1,2,3} and {4}. When the BCW weight index of all CPs are derived from the same group, the BCW weight index may be derived by step (2) below. Otherwise, the BCW weight index may be set to 2.

(2) When at least two CPs have the same BCW weight index, the same BCW weight index may be allocated as a weight index of a constructed affine merge candidate. Otherwise, the weight index of the constructed affine merge candidate may be set to 2.

The invention according to the present disclosure described below relates to a weighted average based bi-prediction and includes a method of deriving a BCW weight index, specifically, when configuring a temporal candidate for a merge mode or a temporal candidate of a subblock merge mode. In addition, according to the present disclosure, a method of deriving a BCW weight index when deriving a pair-wise (merge) candidate is provided. Hereinafter, the BCW weight index may be briefly referred to as a weight index. In addition, according to the present disclosure, various embodiments of deriving a weight index of a constructed affine merge candidate are provided. Various embodiments included in the present disclosure may be used alone or two or more embodiments may be used in combination.

According to an embodiment of the present disclosure, in deriving a merge candidate for a merge mode in units of subblocks, by efficiently deriving a weight index for a constructed affine merge candidate, encoding efficiency may be improved.

As described with reference to FIG. 15, a representative motion vector CPMVk (k being an integer of 1 to 4) for a k-th CP may be derived. That is, CPMV1 may be a motion vector representing a first CP (top-left CP, CP0), CPMV2 may be a motion vector representing a second CP (top-right CP, CP1), CPMV3 may be a motion vector representing a third CP (bottom-left CP, CP2), and CPMV4 may be a motion vector representing a fourth CP (bottom-right CP, RB or CP3). A combination of CPs for deriving the constructed affine merge candidate may include {CP0, CP1, CP2}, {CP0, CP1, CP3}, {CP0, CP2, CP3}, {CP1, CP2, CP3}, {CP0, CP1} and {CP0, CP2}, and the constructed affine merge candidate may be derived in the order of the combination.

According to an example of the present embodiment, the weight index of the constructed affine merge candidate may be derived as a weight index of a block used to derive a predetermined CP among CPs in the combination. For example, when the predetermined CP is a first CP or CP0, the weight index of the constructed affine merge candidate may be derived as a weight index of a block used to derive CPMV1 among the candidate blocks of CP0. For example, in FIG. 15, when a motion vector of B2 among B2, B3 and A2 is determined to be CPMV1, the weight index of the constructed affine merge candidate may be derived to a weight index of B2. However, this is merely an example, and the predetermined CP may be a second CP or third CP in the combination or one of CP0, CP1, CP2 and RB. For example, when the predetermined CP is CP1, the weight index of the constructed affine merge candidate may be derived to the weight index of a block used to derive CPMV2. For example, in FIG. 15, when a motion vector of B0 between B1 and B0 is determined to be CPMV2, the weight index of the constructed affine merge candidate may be derived as the weight index of B0.

According to another example of the present embodiment, a weight index other than a default index among the weight indices of each CP may be used as the weight index of the constructed affine merge candidate. For example, when the combination of CPs for deriving the constructed affine merge candidate is {CP0, CP1, CP2} and the weight indices of CP0 and CP2 are a default index and the weight index of CP1 is not a default index, the weight index of the constructed affine merge candidate may be derived as the weight index of CP1.

According to another example of the present embodiment, the weight index of the constructed affine merge candidate may be determined based on the frequency of occurrence of the weight index. For example, the weight index of the constructed affine merge candidate may be derived using a weight index having a high frequency of occurrence among the weight indices of candidate blocks of a specific CP (e.g., CP0). Alternatively, a weight index having a high frequency of occurrence among weight indices of CPs configuring the constructed affine merge candidate may be used. For example, in the case of a combination of {CP0, CP2, CP3 (RB)}, when the weight indices of CP2 and RB are the same, the weight index of the constructed affine merge candidate may be derived as weight indices of CP2 and RB having a highest frequency of occurrence. In this case, the weight index of RB may be derived based on the method of deriving the weight index of the temporal candidate according to the present disclosure.

Hereinafter, methods of deriving a constructed affine merge candidate according to other embodiments of the present disclosure will be described in detail with reference to FIGS. 19 to 22.

The method of deriving the constructed affine merge candidate according to the present embodiment may include deriving information on CPs (CP0 to CP3) of a current block and deriving a constructed affine merge candidate for each combination using information on the derived CPs.

FIG. 19 is a flowchart illustrating a method of deriving a constructed affine merge candidate according to another embodiment of the present disclosure. The derivation method of FIG. 19 includes a method of deriving a weight index of a constructed affine merge candidate.

As shown in FIG. 19, an image encoding apparatus or an image decoding apparatus may first derive information on each CP of a current block to derive a constructed affine merge candidate (S1910). Each CP of the current block may include the above-described CP0, CP1, CP2 and CP3 (RB). Information on CPn (n being an integer of 0 to 3) may include at least one of a reference picture index (refIdxLXCorner[n]), prediction direction information (predFlagLXCorner[n]), a motion vector (cpMvLXCorner[n]), whether CPn is available (availableFlagCorner[n]) or a weight index (bcwIdxCorner[n]) of CPn.

According to the present embodiment, the weight index of the constructed affine merge candidate may be derived as a weight index of a first CP in each combination. As described above, the combination for deriving the constructed affine merge candidate may be one of {CP0, CP1, CP2}, {CP0, CP1, CP3}, {CP0, CP2, CP3}, {CP1, CP2, CP3}, {CP0, CP1} and {CP0, CP2}. As described above, a first CP in each combination is CP0 or CP1. Accordingly, the weight index of CPn of information on CPn may be derived only for CP0 and CP1. That is, for CP2 and CP3, the process of deriving the weight index of CPn may be skipped. This is because even if the weight index of CP2 or CP3 is derived, this weight index is not used as the weight index for the constructed affine merge candidate.

When the information on each CP is derived in step S1910, the image encoding apparatus or the image decoding apparatus may derive a constructed affine merge candidate based on the information on each CP (S1920). Step S1920 may be performed on each combination for deriving the constructed affine merge candidate. In this case, the image encoding apparatus or the image decoding apparatus may perform step S1920 based on information specifying whether a 6-parameter model may be used. For example, when the 6-parameter model may be used, step S1920 may be performed on both a combination including the three CPs and a combination including the two CPs. When the 6-parameter model may not be used, step S1920 may be performed only on the combination including the two CPs. Since the 6-parameter model references three CPs, when the 6-parameter model may not be used, the constructed affine merge candidate for the combination including the three CPs does not need to be configured. Information specifying whether the 6-parameter model may be used may be signaled through a bitstream. For example, it may be included and signaled in a sequence parameter set which is a higher level of a block.

Figure 20:
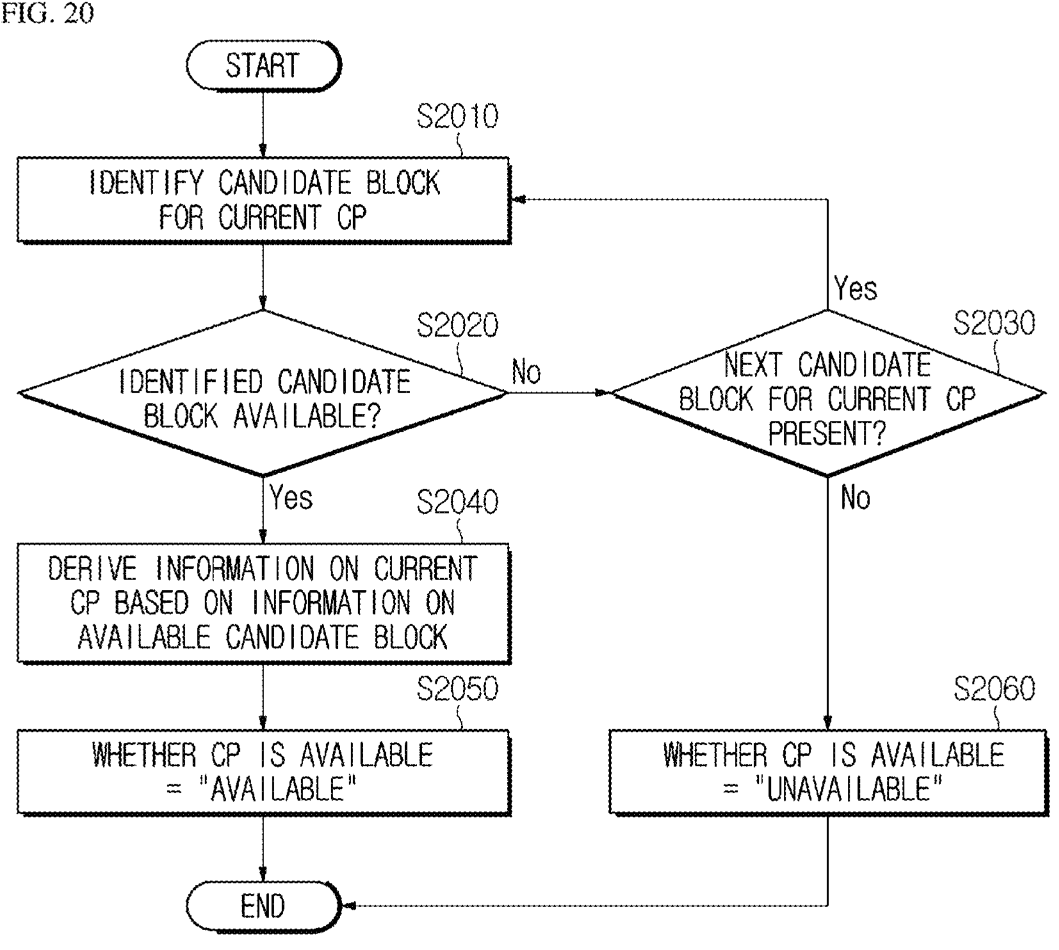
FIG. 20 is a flowchart illustrating a method of deriving information on a CP of a current block according to the embodiment of FIG. 19.

FIG. 20 is a flowchart illustrating a method of deriving information on a CP of a current block according to the embodiment of FIG. 19.

The CP of a current block may include the above-described CP0, CP1, CP2 and CP3 (RB). The method of FIG. 20 may be performed on each CP of the current block. The order of performance may be, for example, CP0, CP1, CP2 and CP3. However, the present disclosure is not limited thereto and the method may be performed in a different order or may be simultaneously performed on some or all of the CPs.

First, in step S2010, candidate blocks for a current CP may be identified. The candidate blocks for each CP have been described with reference to FIG. 15. For example, the candidate blocks of CP0 may be B2, B3 and A2, the candidate blocks of CP1 may be B1 and B0, the candidate blocks of CP2 may be A1 and A0, and the candidate block of CP3 may be T. When the method of FIG. 20 is performed on each CP, the candidate blocks may be checked in the above-described order (scan order). Accordingly, when there is a plurality of candidate blocks, a first block may be first identified. For example, B2 which is a first candidate block for CP0 may be first identified.

When the candidate block for the current CP is identified, in step S2020, whether the identified candidate block is available may be checked. Whether the candidate block is available may be determined depending on whether the candidate block is present in a current picture, whether the candidate block and the current block are present in the same slice or the same tile, or whether the prediction mode of the candidate block and the prediction mode of the current block are the same. For example, when the candidate block is present outside the current picture, when the candidate block and the current block are present in different slices or different tiles or when the prediction mode of the candidate block and the prediction mode of the current block are different, it may be determined that the corresponding candidate block is not available.

When the identified candidate block is not available (S2020—No), it may be determined whether a next candidate block for a current CP is present (S2030). For example, when the current CP is CP0 and the identified candidate block is B2, since a next candidate block B3 according to the above-described order is present, in step S2030, it may be determined that the next candidate block is present. For example, when the current CP is CP0 and the identified candidate block is A2, since a next candidate block according to the above-described order is not present, in step S2030, it may be determined that the next candidate block is not present.

When the next candidate block for the current CP is present (S2030—Yes), steps S2010 to S2020 may be performed on the next candidate block. When the next candidate block for the current CP is not present (S2030—No), whether the current CP is available (availableFlagCorner) may be set to "unavailable" (S2060).

When the identified candidate block is available (S2020—Yes), information on the current CP may be derived based on information on the available candidate block (S2040). For example, a reference picture index, prediction direction information, motion vector and weight index of the available candidate block may be used as information on the current CP. In this case, as described above, only when the current CP is CP0 or CP1, the weight index of the available candidate block may be used as the weight index of the current CP. In addition, when the identified candidate block is available, whether the current CP is available (availableFlagCorner) may be set to "available" (S2050).

When information on each CP of the current block is derived, the constructed affine merge candidate may be derived based on the information.

Figure 21:
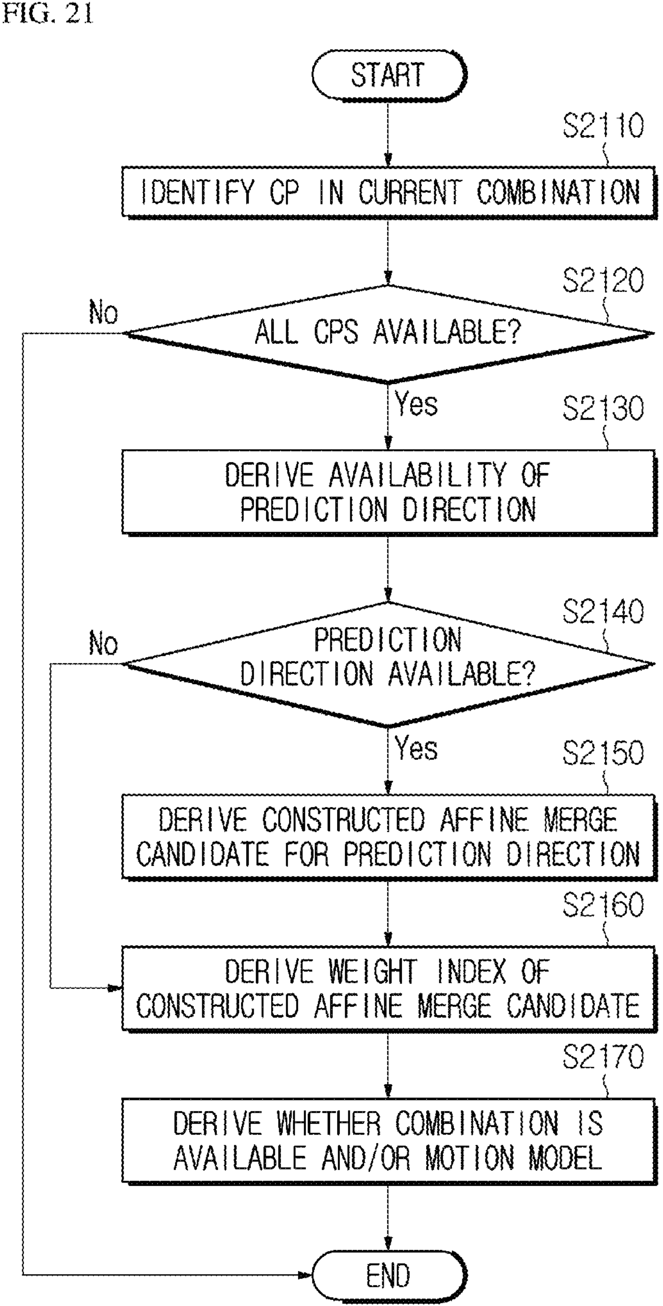
FIG. 21 is a view illustrating a method of deriving a constructed affine merge candidate based on information on each CP according to the embodiment of FIG. 19.

FIG. 21 is a view illustrating a method of deriving a constructed affine merge candidate based on information on each CP according to the embodiment of FIG. 19.

The method of FIG. 21 may be performed on each of combinations {CP0, CP1, CP2}, {CP0, CP1, CP3}, {CP0, CP2, CP3}, {CP1, CP2, CP3}, {CP0, CP1} and {CP0, CP2} for deriving a constructed affine merge candidate. The order of performance may be, for example, the listed order. In addition, as described above, the method of FIG. 21 may be performed only on some of the combinations depending on whether the 6-parameter model is available.

First, in step S2110, CPs in a current combination for deriving a constructed affine merge candidate may be identified. Thereafter, in step S2120, it may be determined whether the CPs in the current combination are available. Step S2120 may be performed based on information (availableFlagCorner) specifying whether each CP in the combination is available. For example, when the current combination is {CP0, CP1, CP2}, step S2120 may be performed based on availableFlagCorner[0], availableFlagCorner[1] and availableFlagCorner[2]. When all the CPs in the current combination are available (S2120—Yes), steps 2130 to S2150 may be performed for each of prediction directions (L0 direction and L1 direction). Otherwise (S2120—No), since the constructed affine merge candidate cannot be derived for the current combination, the method of FIG. 21 is finished.

When all the CPs in the combination are available (S2120—Yes), in step S2130, availability (availableFlagL0 and availableFlagL1) for each of the L0 prediction direction and the L1 prediction direction may be derived. For example, when the current combination is {CP0, CP1, CP2}, for the prediction direction LX (X being 0 or 1), if all the prediction direction information (predFlagLXCorner[n]) of CP0, CP1 and CP2 is 1 and all the reference picture indices (refIdxLXCorner[n]) of CP0, CP1 and CP2 are the same, availability of the prediction direction is derived as "available" and, otherwise, is derived as "unavailable".

Thereafter, in step S2140, it may be determined whether the prediction direction LX is available and, if it is "available" (S2140—Yes) the method may proceed to step S2150. In step S2150, the constructed affine merge candidate may be derived based on information on the CP for the prediction direction LX. For example, when the input combination is {CP0, CP1, CP2}, for an available prediction direction LX (X being 0 or 1), the reference picture index (refIdxLXCorner[0]) of CP0, the motion vector (cpMvLXCorner[0]) of CP0, the motion vector (cpMvLXCorner[1]) of CP1 and the motion vector (cpMvLXCorner[2]) of CP2 may be allocated to the reference picture index (refIdxLXConst1), CPMV1, CPMV2 and CPMV3 of the corresponding constructed affine merge candidate, respectively. When availability of the prediction direction LX is "unavailable" (S2140—No) step S2150 may be skipped and the method may proceed to step S2160.

Thereafter, in step S2160, the weight index of the constructed affine merge candidate may be derived. Step S2160 may be performed based on whether the prediction direction LX is available. For example, when both directions L0 and L1 are available, the weight index of the constructed affine merge candidate may be derived as the weight index of the first CP in the combination. For example, when the current combination is {CP0, CP1, CP2}, the weight index of CP0 may be used as the weight index of the constructed affine merge candidate. When L0 or L1 is not available, the weight index of the constructed affine merge candidate may be derived as a predetermined index. The predetermined index may be a default index, and may be, for example, an index specifying an equal weight.

Thereafter, in step S2170, whether the current combination is available and/or a motion model may be derived. Step S2170 may be performed based on whether the prediction direction LX is available and/or the number of CPs in the combination. For example, when L0 or L1 is available, whether the current combination is available may be derived as "available". In this case, when the number of CPs in the current combination is 3, the motion model of the current combination may be derived as a 6-parameter affine model. When the number CPs in the current combination is 2, the motion model of the current combination may be derived as a 4-parameter affine model.

Otherwise (both L0 and L1 are not available), whether the current combination is available may be derived as "unavailable". In addition, the motion model of the current combination may be derived as an conventional translational motion model.

Figure 22:
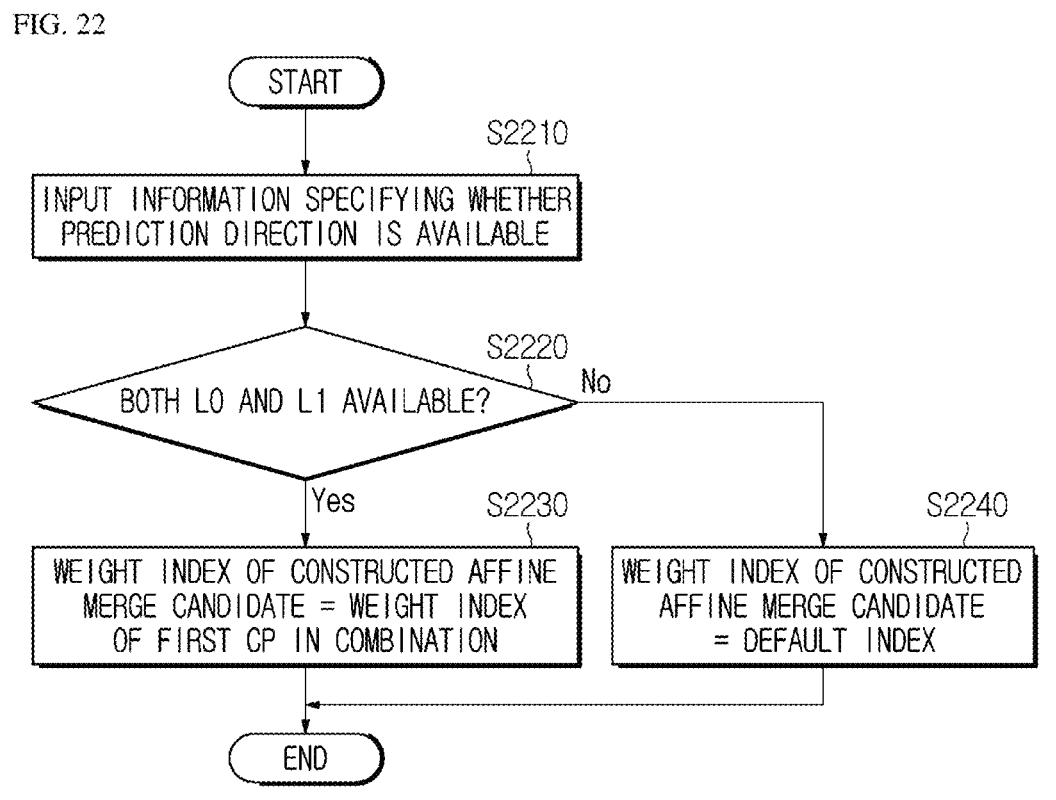

FIG. 22 is a view exemplarily illustrating a method of deriving a weight index of a constructed affine merge candidate according to the embodiment of FIG. 21.

As described above, the weight index of the constructed affine merge candidate may be derived based on whether the prediction direction LX is available. For this, information specifying availability of the prediction direction derived in step S2130 may be input (S2210).

Thereafter, in step S2220, whether both L0 and L1 are available may be determined. When both L0 and L1 are available (S2220—Yes), the weight index of the constructed affine merge candidate may be derived as the weight index of a first CP in the combination (S2230). For example, when the input combination is {CP0, CP1, CP2}, the weight index of CP0 may be used as the weight index of the constructed affine merge candidate. For example, when the input combination is {CP1, CP2, CP3}, the weight index of CP1 may be used as the weight index of the constructed affine merge candidate.

When L0 or L1 is not available (S2220—No), the weight index of the constructed affine merge candidate may be derived as a predetermined index as described above (S2240). The predetermined index may be a default index and may be, for example, an index specifying an equal weight.

According to the embodiment described with reference to FIGS. 19 to 22, based on whether both L0 and L1 are available, the weight index of a first CP in the combination or the default index is set to the weight index of the constructed affine merge candidate. According to another example of the present embodiment, regardless of whether L0 and L1 are available, the weight index of the first CP in the combination may be set to the weight index of the constructed affine merge candidate. Alternatively, the weight index of a CP at a predetermined position in the combination may be used. Accordingly, since the process of determining whether L0 and L1 are available may be skipped, the effect of lowering computational complexity and enabling rapid processing may be expected.

Hereinafter, a method of deriving a weight index of a constructed affine merge candidate according to another embodiment of the present disclosure will be described with reference to FIG. 23.

According to the present embodiment, The weight index of the constructed affine merge candidate may be derived based on the weight index and/or the weight index group of each CP. A weight w may be selected from a set of 5 predefined weights (e.g., {−2,3,4,5,10}) based on the weight index of each CP. In this case, the weight indices may have values of 0 to 4, and may be classified into three groups. For example, the weight index may be classified into three groups {0}, {1, 2, 3} and {4}. In this case, a weight index group specifying a group, to which each weight index belongs, may have a value of 0 to 2. As the weight indices are classified into three groups, pairs of weights specified by each index may be classified into three groups. For example, the pairs of weights may be classified into three groups {(−1/4, 5/4)}, {(1/4, 3/4), (2/4, 2/4), (3/4, 1/4)} and {(5/4, −1/4)}.

Figure 23:
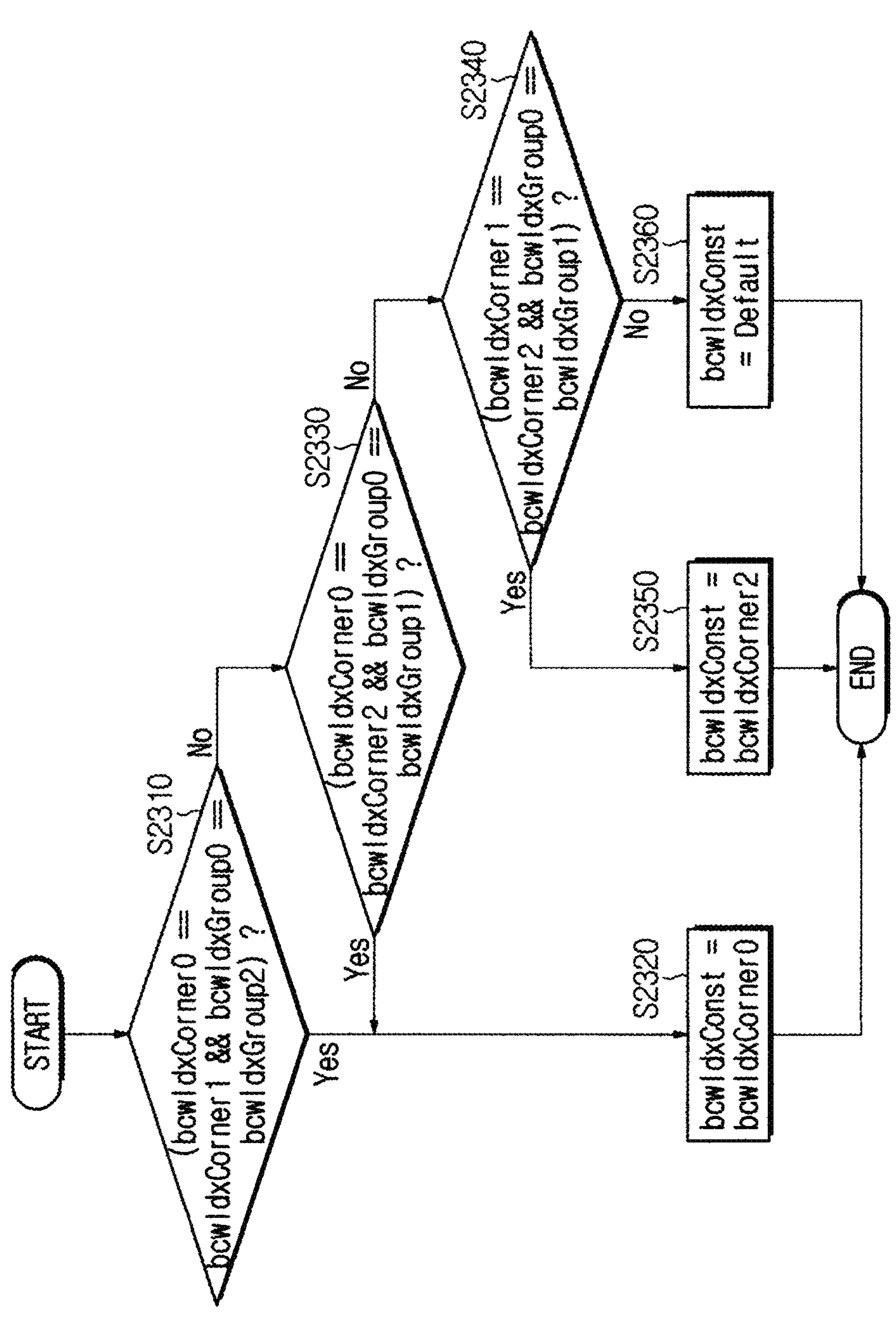
FIG. 23 is a view illustrating a method of deriving a constructed affine merge candidate based on information on each CP according to another embodiment of the present disclosure.

FIG. 23 is a flowchart illustrating an example of a method of deriving a weight index of a constructed affine merge candidate according to the present disclosure.

In FIG. 23, bcwIdxCorner0, bcwIdxCorner1 and bcwIdxCorner2 denote a weight index of a first CP in a combination, a weight index of a second CP in the combination and a weight index of a third CP in the combination, respectively. In addition, bcwIdxGroup0, bcwIdxGroup1 and bcwIdxGroup2 denote a weight index group of the first CP in the combination, a weight index group of the second CP in the combination and a weight index group of the third CP in the combination, respectively. In addition, bcwIdxConst denotes the weight index of the constructed affine merge candidate.

As shown in FIG. 23, in step S2310, whether bcwIdxCorner0 and bcwIdxCorner1 are the same and whether bcwIdxGroup0 and bcwIdxGroup2 are the same may be checked. When both are the same (S2310—Yes), bcwIdxConst may be derived as bcwIdxCorner0 (S2320).

Otherwise (S2310—No), in step S2330, whether bcwIdxCorner0 and bcwIdxCorner2 are the same and whether bcwIdxGroup0 and bcwIdxGroup1 are the same may be checked. When both are the same (S2330—Yes), bcwIdxConst may be derived as bcwIdxCorner0 (S2320).

Otherwise (S2330—No), in step S2340, whether bcwIdxCorner1 and bcwIdxCorner2 are the same and whether bcwIdxGroup1 and bcwIdxGroup0 are the same may be checked. When both are the same (S2340—Yes), bcwIdxConst may be derived as bcwIdxCorner2 (S2350).

Otherwise (S2340—No), bcwIdxConst may be derived as a default index (S2360). The default index may be, for example, an index specifying an equal weight.

According to the example shown in FIG. 23, when three CPs are used, the weight index of the constructed affine merge candidate may be derived by a maximum of six comparison operations.

The method shown in FIG. 23 may be simplified as follows. As described above, the weight index of the temporal candidate is derived as a default index and the temporal candidate is included as the last CP of each combination. Accordingly, in the method shown in FIG. 23, comparison of bcwIdxCorner2 may be skipped.

In this case, step S2330 may be performed by checking only whether bcwIdxGroup0 and bcwIdxGroup1 are the same. In addition, step S2340 may be performed by checking only whether bcwIdxGroup0 and bcwIdxGroup1 are the same. In this case, step S2330 and step S2340 substantially check the same condition and thus may be combined into one step.

Figure 24:
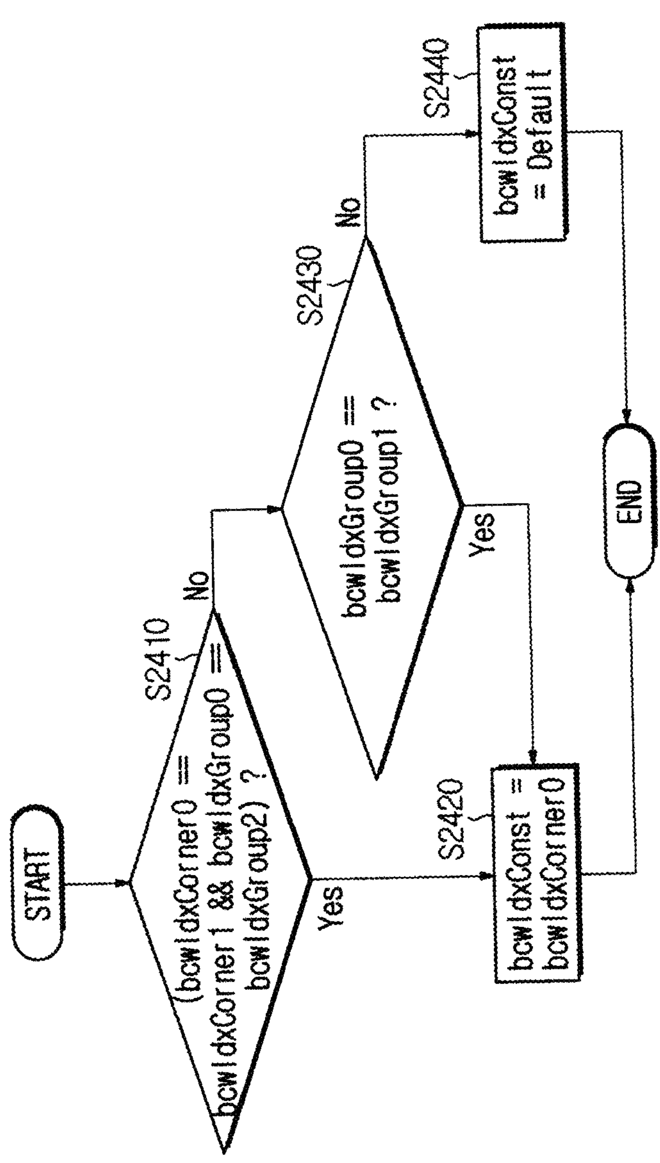
FIG. 24 is a flowchart illustrating a method of skipping comparison of bcwIdxCorner2 according to the present disclosure.

FIG. 24 is a flowchart illustrating a method of skipping comparison of bcwIdxCorner2 according to the present disclosure.

As shown in FIG. 24, in step S2410, whether bcwIdxCorner0 and bcwIdxCorner1 are the same and whether bcwIdxGroup0 and bcwIdxGroup2 are the same may be checked. When both are the same (S2410—Yes), bcwIdxConst may be derived as bcwIdxCorner0 (S2420).

Otherwise (S2410—No), whether bcwIdxGroup0 and bcwIdxGroup1 are the same may be checked (S2430). When they are the same (S2430—Yes), bcwIdxConst may be derived as bcwIdxCorner0 (S2420).

Otherwise (S2430—No), bcwIdxConst may be derived as a default index (S2440).

The method shown in FIG. 23 may be simplified as follows. For example, three weights may be used as in a non-low-delay picture and the three weights may belong to one group. In this case, in the method shown in FIG. 23, comparison of a weight index group may be skipped.

Figure 25:
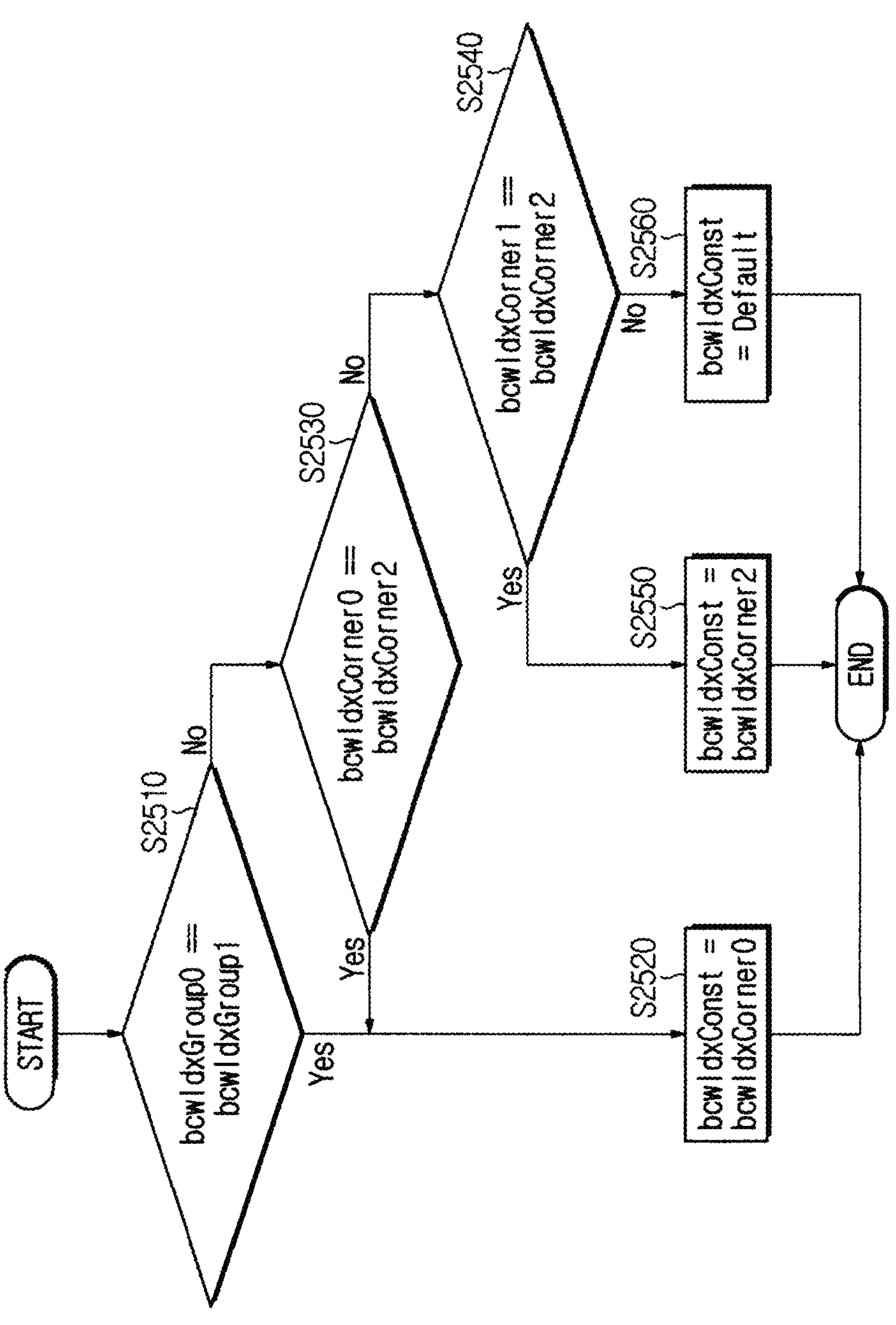
FIG. 25 is a flowchart illustrating a method in which comparison of a weight index group is skipped according to the present disclosure.

FIG. 25 is a flowchart illustrating a method in which comparison of a weight index group is skipped according to the present disclosure.

As shown in FIG. 25, in step S2510, whether bcwIdxCorner0 and bcwIdxCorner1 are the same may be checked. When they are the same (S2510—Yes), bcwIdxConst may be derived as bcwIdxCorner0 (S2520).

Otherwise (S2510—No), whether bcwIdxCorner0 and bcwIdxCorner2 are the same may be checked (S2530). When they are the same (S2530—Yes), bcwIdxConst may be derived as bcwIdxCorner0 (S2520).

Otherwise (S2530—No), whether bcwIdxCorner1 and bcwIdxCorner2 are the same may be checked (S2540). When they are the same (S2540—Yes), bcwIdxConst may be derived as bcwIdxCorner2 (S2550).

Otherwise (S2540—No), bcwIdxConst may be derived as a default index (S2560).

The method shown in FIG. 23 may be simplified as follows. In the method shown in FIG. 23, comparison of bcwIdxCorner2 and comparison of a weight index group may be skipped.

Figure 26:
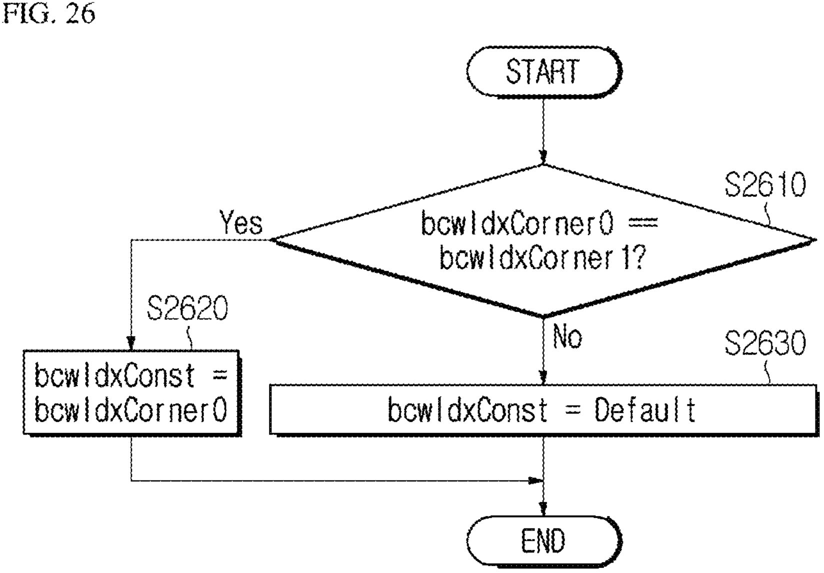
FIG. 26 is a flowchart illustrating a method in which comparison of bcwIdxCorner2 and comparison of a weight index group are skipped according to the present disclosure.

FIG. 26 is a flowchart illustrating a method in which comparison of bcwIdxCorner2 and comparison of a weight index group are skipped according to the present disclosure.

As shown in FIG. 26, in step S2610, whether bcwIdxCorner0 and bcwIdxCorner1 are the same may be checked, and, when they are the same (S2610—Yes), bcwIdxConst may be derived as bcwIdxCorner0 (S2620). Otherwise (S2610—No), bcwIdxConst may be derived as default index (S2630).

According to another example of the present embodiment, bcwIdxConst may be derived as bcwIdxCorner0 without performing any comparison.

According to another embodiment of the present disclosure, when configuring a motion vector candidate for a merge mode in units of subblocks, a method of deriving a weight index when a representative prediction vector candidate uses bi-prediction may be provided. As described with reference to FIG. 18, a subblock based TMVP may derive a col block corresponding to a current block based on a motion shift. In this case, as shown in FIG. 18, the motion shift may be derived from a left block A1 spatially adjacent to the current block. That is, the probability that the weight index of the left block is reliable is high. Accordingly, in consideration of this, the weight index of the left block may be used as the weight index of the current block. That is, when a candidate derived by ATMVP uses bi-prediction, the weight index of the left block may be used as the weight index for the merge mode of the subblock. Alternatively, when the motion shift is derived from a neighboring block other than the block A1, the weight index of the corresponding neighboring block may be used as the weight index of the current block. According to the present embodiment, when configuring a motion vector candidate for a merge mode in units of subblocks, by efficiently configuring the weight for the representative prediction vector candidate, encoding efficiency may be improved without increasing complexity.

According to another embodiment of the present disclosure, in deriving a merge candidate for a merge mode, when a temporal merge candidate uses bi-prediction, by efficiently deriving the weight index of the temporal candidate, encoding efficiency may be improved.

According to an example of the present embodiment, the weight index of the temporal merge candidate may always be derived as a default index (e.g., 0). In the present disclosure, the default index may be an index specifying that weights for the prediction directions (that is, L0 prediction direction and L1 prediction direction in bi-prediction) are equal (equal weight).

According to another example of the present embodiment, the weight index of the temporal merge candidate may be derived as a weight index of a collocated block.

According to another embodiment of the present disclosure, in deriving a merge candidate for a merge mode in units of subblocks, when a temporal merge candidate uses bi-prediction, by efficiently deriving the weight index of the temporal candidate, encoding efficiency may be improved.

According to an example of the present embodiment, the weight index of the temporal candidate may always be derived as a default index (e.g., 0). In this case, when the temporal candidate is selected from a subblock merge candidate list based on a merge index, the weight index of the current block may be set to a default index.

According to another example of the present embodiment, the weight index of the temporal candidate may be derived as the weight index of a center block. The center block may be a block in the collocated picture including coordinates corresponding to the center position of the current block. The coordinates corresponding to the center position may be derived based on the top-left coordinates (x, y) of the current block and the width and height of the current block. For example, the coordinates corresponding to the center position may be (x+width/2, y+height/2).

According to another example of the present embodiment, the weight index of the temporal candidate may be derived as the weight index of the collocated subblock corresponding to the current subblock. When the collocated subblock is not available or the weight index of the collocated subblock is not available, the weight index of the temporal candidate of the current subblock may be derived as the weight index of the center block.

According to another embodiment of the present disclosure, in deriving a merge candidate for a merge mode, by efficiently deriving the weight index of the pair-wise candidate, encoding efficiency may be improved. As described above, the pair-wise candidates may be derived based on predefined candidate pairs selected from the candidates included in the merge candidate list. In this case, the candidate pairs for deriving the pair-wise candidates may be denoted by cand0 and cand1.

According to an example of the present embodiment, when the pair-wise candidate uses bi-prediction, the weight index of the pair-wise candidate may be derived as the weight index of cand0. Alternatively, the weight index of the pair-wise candidate may be derived as the weight index of cand0, or may be derived as the weight index other than the default index (index specifying the weight of 1:1) among the weight index of cand0 and the weight index of cand1.

According to another example of the present embodiment, the weight index of the pair-wise candidate may be derived as at least one of the following four methods.

- the weight index of cand0
- the weight index of the bi-predicted candidate among cand0 and cand1
- When cand0 and cand1 have the same weight index, it may be set to the corresponding weight index, and, otherwise, may be set to a default index.
- When cand0 and cand1 have the same weight index, it may be set to the corresponding weight index, and, otherwise, may be set to the weight index other than the default index among the weight index of cand0 and the weight index of cand1.

According to another example of the present embodiment, consistency with the method of deriving the constructed affine candidate may be considered. This is because the pair-wise candidate and the constructed affine candidate have similar characteristics in that they are generated by combining a plurality of candidates. That is, when the weight index of cand0 is denoted by bcwIdx0 and the weight index of cand1 is denoted by bcwIdx1, at least one of the following two methods may apply in order to derive the weight index of the pair-wise candidate.

- The weight index may be set based on whether bcwIdx0 and bcwIdx1 are the same. First, whether bcwIdx0 and bcwIdx1 are the same may be determined. When both are the same, the weight index of the pair-wise candidate may be derived as bcwIdx0. When both are the same, the weight index of the pair-wise candidate may be derived as the default index.
- Simply, the weight index of the pair-wise candidate may be set to the weight index (e.g., bcwIdx0) of a first candidate.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 27:
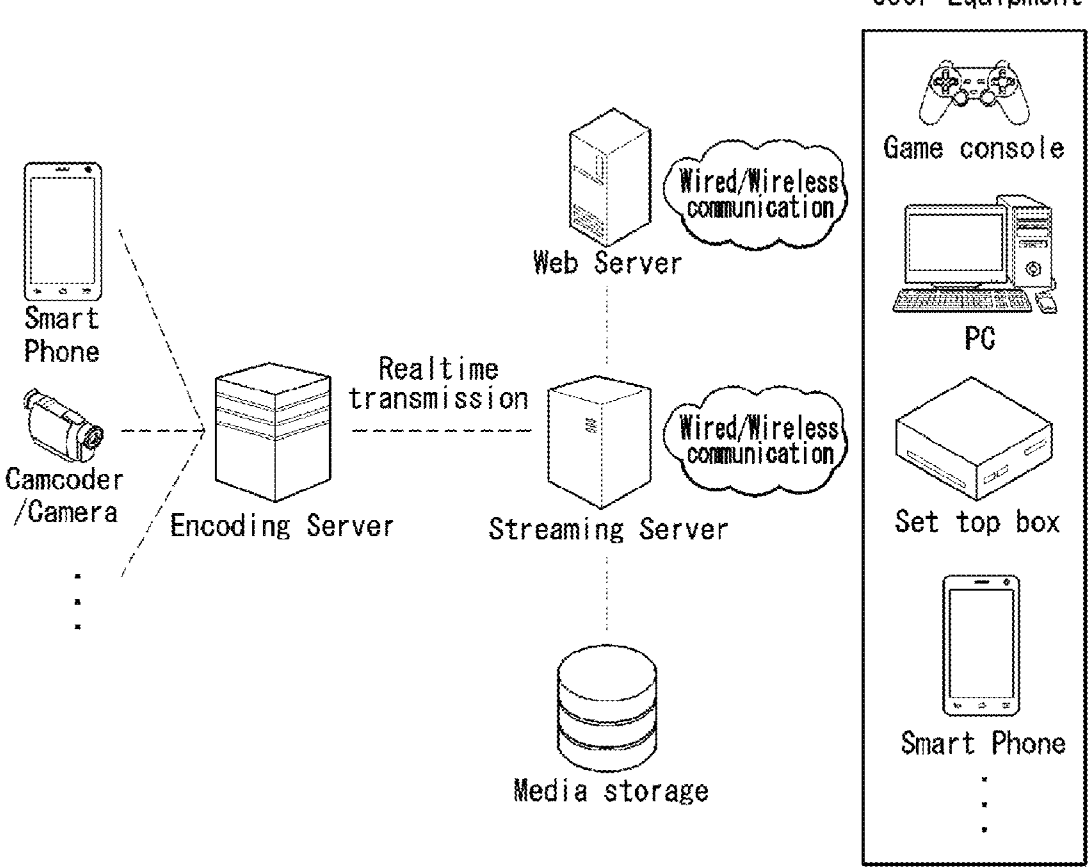
FIG. 27 is a view showing a content streaming system, to which an embodiment of the present disclosure is applicable.

FIG. 27 is a view showing a content streaming system, to which an embodiment of the present disclosure is applicable.

As shown in FIG. 27, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

obtaining information on a subblock merge candidate;

constructing a subblock merge candidate list for a current block;

selecting one subblock merge candidate from the subblock merge candidate list based on the information on the subblock merge candidate;

deriving motion information of the current block based on motion information of the selected subblock merge candidate; and generating prediction samples of the current block based on the motion information of the current block, wherein the constructing the subblock merge candidate list comprises deriving a constructed subblock merge candidate, and the deriving the constructed subblock merge candidate comprises deriving a weight index for bi-prediction of the constructed subblock merge candidate, wherein the deriving the constructed subblock merge candidate is performed based on motion information of each candidate control point (CP) included in a combination of predefined candidate CPs among a plurality of candidate CPs for the current block, wherein the predefined candidate CPs have a predetermined order in the combination, wherein the weight index of the constructed subblock merge candidate is derived based on the order in the combination of the predefined candidate CPs, and wherein the weight index of the constructed subblock merge candidate is derived as a weight index of the first candidate CP among the candidate CPs in the combination.

2. The image decoding method of claim 1, wherein the motion information of the candidate CP is derived based on motion information of a candidate block for the candidate CP, and wherein the candidate block is an available candidate block among at least one candidate block for the candidate CP.

3. The image decoding method of claim 1, wherein the motion information of the candidate CP comprises a weight index for bi-prediction, and the weight index for bi-prediction is derived based on the candidate CP being a top-left candidate CP or top-right candidate CP for the current block.

4. The image decoding method of claim 1, wherein the motion information of the candidate CP comprises a weight index for bi-prediction, and the weight index for bi-prediction is not derived based on the candidate CP being a bottom-left candidate CP or bottom-right candidate CP for the current block.

5. The image decoding method of claim 2, wherein the candidate CP is determined to be unavailable based on an available candidate block among at least one candidate block for the candidate CP being not present.

6. The image decoding method of claim 5, wherein the deriving the constructed subblock merge candidate is performed based on all candidate CPs included in the combination of the predefined candidate CPs being available.

7. The image decoding method of claim 1, wherein the weight index of the constructed subblock merge candidate is derived based on whether a prediction direction for the combination is available, and wherein whether the prediction direction for the combination is available is derived based on motion information of the candidate CPs included in the combination.

8. The image decoding method of claim 7, wherein, based on whether the prediction direction for the combination being available for both an L0 direction and an L1 direction, the weight index of the constructed subblock merge candidate is derived as the weight index of the first candidate CP.

9. The image decoding method of claim 8, wherein, based on whether the prediction direction for the combination being unavailable for at least one of the L0 direction or the L1 direction, the weight index of the constructed subblock merge candidate is derived as a predetermined weight index.

10. An image encoding method performed by an image encoding apparatus, the image encoding method comprising:

constructing a subblock merge candidate list for a current block;

generating prediction samples of the current block based on motion information of a subblock merge candidate included in the subblock merge candidate list; and encoding information on the subblock merge candidate, wherein the constructing the subblock merge candidate list comprises deriving a constructed subblock merge candidate, and the deriving the constructed subblock merge candidate comprises deriving a weight index for bi-prediction of the constructed subblock merge candidate, wherein the deriving the constructed subblock merge candidate is performed based on motion information of each candidate control point (CP) included in a combination of predefined candidate CPs among a plurality of candidate CPs for the current block, wherein the predefined candidate CPs have a predetermined order in the combination, wherein the weight index of the constructed subblock merge candidate is derived based on the order in the combination of the predefined candidate CPs, and wherein the weight index of the constructed subblock merge candidate is derived as a weight index of the first candidate CP among the candidate CPs in the combination.

11. A method of transmitting a bitstream generated by an image encoding method, the image encoding method comprising:

constructing a subblock merge candidate list for a current block;

generating prediction samples of the current block based on motion information of a subblock merge candidate included in the subblock merge candidate list; and encoding information on the subblock merge candidate, wherein the constructing the subblock merge candidate list comprises deriving a constructed subblock merge candidate, and the deriving the constructed subblock merge candidate comprises deriving a weight index for bi-prediction of the constructed subblock merge candidate, wherein the deriving the constructed subblock merge candidate is performed based on motion information of each candidate control point (CP) included in a combination of predefined candidate CPs among a plurality of candidate CPs for the current block, wherein the predefined candidate CPs have a predetermined order in the combination, wherein the weight index of the constructed subblock merge candidate is derived based on the order in the combination of the predefined candidate CPs, and wherein the weight index of the constructed subblock merge candidate is derived as a weight index of the first candidate CP among the candidate CPs in the combination.

12. An image decoding apparatus comprising a memory and at least one processor, wherein the at least one processor is configured to perform:

obtaining information on a subblock merge candidate;

constructing a subblock merge candidate list for a current block;

selecting one subblock merge candidate from the subblock merge candidate list based on the information on the subblock merge candidate;

deriving motion information of the current block based on motion information of the selected subblock merge candidate; and generating prediction samples of the current block based on the motion information of the current block, wherein the constructing the subblock merge candidate list comprises deriving a constructed subblock merge candidate, and the deriving the constructed subblock merge candidate comprises deriving a weight index for bi-prediction of the constructed subblock merge candidate, wherein the deriving the constructed subblock merge candidate is performed based on motion information of each candidate control point (CP) included in a combination of predefined candidate CPs among a plurality of candidate CPs for the current block, wherein the predefined candidate CPs have a predetermined order in the combination, wherein the weight index of the constructed subblock merge candidate is derived based on the order in the combination of the predefined candidate CPs, and wherein the weight index of the constructed subblock merge candidate is derived as a weight index of the first candidate CP among the candidate CPs in the combination.

13. The image decoding apparatus of claim 12, wherein the motion information of the candidate CP is derived based on motion information of a candidate block for the candidate CP, and wherein the candidate block is an available candidate block among at least one candidate block for the candidate CP.

14. The image decoding apparatus of claim 12, wherein the motion information of the candidate CP comprises a weight index for bi-prediction, and the weight index for bi-prediction is derived based on the candidate CP being a top-left candidate CP or top-right candidate CP for the current block.

15. The image decoding apparatus of claim 12, wherein the motion information of the candidate CP comprises a weight index for bi-prediction, and the weight index for bi-prediction is not derived based on the candidate CP being a bottom-left candidate CP or bottom-right candidate CP for the current block.

16. The image decoding apparatus of claim 13, wherein the candidate CP is determined to be unavailable based on an available candidate block among at least one candidate block for the candidate CP being not present.

17. The image decoding apparatus of claim 16, wherein the deriving the constructed subblock merge candidate is performed based on all candidate CPs included in the combination of the predefined candidate CPs being available.

18. The image decoding apparatus of claim 12, wherein the weight index of the constructed subblock merge candidate is derived based on whether a prediction direction for the combination is available, and wherein whether the prediction direction for the combination is available is derived based on motion information of the candidate CPs included in the combination.

19. An image encoding apparatus comprising a memory and at least one processor, wherein the at least one processor is configured to perform:

constructing a subblock merge candidate list for a current block;

generating prediction samples of the current block based on motion information of a subblock merge candidate included in the subblock merge candidate list; and encoding information on the subblock merge candidate, wherein the constructing the subblock merge candidate list comprises deriving a constructed subblock merge candidate, and the deriving the constructed subblock merge candidate comprises deriving a weight index for bi-prediction of the constructed subblock merge candidate, wherein the deriving the constructed subblock merge candidate is performed based on motion information of each candidate control point (CP) included in a combination of predefined candidate CPs among a plurality of candidate CPs for the current block, wherein the predefined candidate CPs have a predetermined order in the combination, wherein the weight index of the constructed subblock merge candidate is derived based on the order in the combination of the predefined candidate CPs, and wherein the weight index of the constructed subblock merge candidate is derived as a weight index of the first candidate CP among the candidate CPs in the combination.

20. An apparatus comprising a memory and at least one processor, wherein the apparatus is configured to transmit a bitstream generated by an image encoding method, the image encoding method comprising:

constructing a subblock merge candidate list for a current block;

generating prediction samples of the current block based on motion information of a subblock merge candidate included in the subblock merge candidate list; and encoding information on the subblock merge candidate, wherein the constructing the subblock merge candidate list comprises deriving a constructed subblock merge candidate, and the deriving the constructed subblock merge candidate comprises deriving a weight index for bi-prediction of the constructed subblock merge candidate, wherein the deriving the constructed subblock merge candidate is performed based on motion information of each candidate control point (CP) included in a combination of predefined candidate CPs among a plurality of candidate CPs for the current block, wherein the predefined candidate CPs have a predetermined order in the combination, wherein the weight index of the constructed subblock merge candidate is derived based on the order in the combination of the predefined candidate CPs, and wherein the weight index of the constructed subblock merge candidate is derived as a weight index of the first candidate CP among the candidate CPs in the combination.

* * * * *